(12) United States Patent
Matsuoka et al.

(10) Patent No.: US 11,972,594 B2
(45) Date of Patent: Apr. 30, 2024

(54) IMAGE PROCESSING APPARATUS, RECORDING MEDIUM HAVING IMAGE PROCESSING PROGRAM RECORDED THEREON, AND IMAGE PROCESSING METHOD FOR IMAGE DATA SIZE REDUCTION

(71) Applicant: SHARP KABUSHIKI KAISHA, Sakai (JP)

(72) Inventors: Teruhiko Matsuoka, Sakai (JP); Akihito Yoshida, Sakai (JP); Masahiko Takashima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 212 days.

(21) Appl. No.: 17/673,484

(22) Filed: Feb. 16, 2022

(65) Prior Publication Data

US 2022/0284631 A1  Sep. 8, 2022

(30) Foreign Application Priority Data

Mar. 5, 2021 (JP) .................................. 2021-034957

(51) Int. Cl.
*G06T 7/90* (2017.01)
(52) U.S. Cl.
CPC ...... *G06T 7/90* (2017.01); *G06T 2207/10024* (2013.01); *G06T 2207/30176* (2013.01)
(58) Field of Classification Search
None
See application file for complete search history.

(56) References Cited

U.S. PATENT DOCUMENTS

| | | | | |
|---|---|---|---|---|
| 5,130,786 | A | * | 7/1992 | Murata .................... G06T 9/005 375/240.25 |
| 5,553,160 | A | * | 9/1996 | Dawson .................. G06T 9/007 358/426.14 |
| 5,999,710 | A | * | 12/1999 | Smith ................. G06K 15/1865 358/1.15 |
| 6,289,118 | B1 | * | 9/2001 | Cossey ..................... G06T 9/00 382/162 |
| 7,415,158 | B1 | * | 8/2008 | O'Neill .................. H04N 1/648 382/232 |
| 7,991,238 | B2 | * | 8/2011 | Malvar .................. H04N 19/94 382/166 |
| 2005/0165796 | A1 | * | 7/2005 | Moore .................... G06F 16/51 707/E17.031 |
| 2010/0027882 | A1 | * | 2/2010 | Matsuoka .............. H04N 1/642 382/166 |
| 2010/0303297 | A1 | * | 12/2010 | Mikhailov ................ G06T 7/11 382/103 |

FOREIGN PATENT DOCUMENTS

JP  2003-298853 A  10/2003

* cited by examiner

*Primary Examiner* — Jason A Pringle-Parker
(74) *Attorney, Agent, or Firm* — ScienBiziP, P.C.

(57) ABSTRACT

A multifunction peripheral includes a color number conversion determiner. The color number conversion determiner determines whether it is appropriate to perform either an index color process or a full-color process based on a color distribution degree, which is a distribution degree of pixel values of the respective sets of pixel data included in input image data, a photograph area ratio, which is a ratio of photograph area pixel data forming a photograph area to the pixel data, and a color uniformity area ratio, which is a ratio of white base area pixel data forming a white base area to the pixel data.

11 Claims, 20 Drawing Sheets

| L | C1 | C2 | COUNT VALUE |
|---|----|----|-------------|
| 0 | 0 | 0 | 0 |
| 0 | 0 | 1 | 0 |
| ⋮ | ⋮ | ⋮ | ⋮ |
| 31 | 0 | 0 | 0 |
| 0 | 1 | 0 | 0 |
| ⋮ | ⋮ | ⋮ | ⋮ |
| 31 | 16 | 16 | 300000 |
| ⋮ | ⋮ | ⋮ | ⋮ |
| 31 | 16 | 25 | 50000 |
| ⋮ | ⋮ | ⋮ | ⋮ |
| 31 | 31 | 30 | 0 |
| 31 | 31 | 31 | 0 |

IMAGE PROCESSING APPARATUS, RECORDING MEDIUM HAVING IMAGE PROCESSING PROGRAM RECORDED THEREON, AND IMAGE PROCESSING METHOD FOR IMAGE DATA SIZE REDUCTION

INCORPORATION BY REFERENCE

This application is based upon and claims the benefit of priority from the corresponding Japanese Patent Application No. 2021-034957 filed on Mar. 5, 2021, the entire contents of which are incorporated herein by reference.

BACKGROUND

Field of the Invention

The present invention relates to an image processing apparatus, a recording medium having an image processing program recorded thereon, and an image processing method, and in particular to an image processing apparatus, a recording medium having an image processing program recorded thereon, and an image processing method to determine whether it is appropriate to perform a compression process using a lossless compression method after performing a color reduction process on input image data or it is appropriate to perform a compression process using a lossy compression method without performing a color reduction process on input image data with the intention to reduce the data amount while preventing the deterioration of the image quality.

Description of the Background Art

Conventionally, color separation by simple clustering is performed on input image data (color image data). With regard to input image data having a relatively large number of colors after color separation, it is assumed that the input image data includes a natural image such as photograph, and a compression process using a method suitable for full-color image data is performed. On the other hand, with regard to input image data having a relatively small number of colors after color separation, it is assumed that most of the colors included in the input image data are colors of the characters or the base (basis material), and a color reduction process is performed and then a compression process is performed by using a method suitable for index color image data having undergone the color reduction process. An appropriate process including a compression process is performed in this manner based on the number of colors after color separation so that the data amount may be reduced while the degradation of the image quality is prevented.

One of the possible compression processes using a method suitable for full-color image data is a compression process using a lossy compression method such as JPEG. As a compression process using a lossy compression method is not adoptable as the compression process using the method suitable for index color image data having undergone the color reduction process, it is considered that a compression process using a lossless compression method is adopted.

According to a conventional technique, the input image data having a relatively small number of colors after color separation is subjected to a color reduction process and then to a compression process using a lossless compression method even when the input image data includes a natural image such as photograph (having a relatively small number of colors), and in particular, even when the natural image such as photograph has a relatively large size. However, in such input image data, there is color (pixel value) discontinuity between pixels forming the natural image such as photograph, and therefore the compression process using the lossless compression method after the color reduction process conversely causes a reduction in the compression rate and does not achieve the desired effect of reducing the data amount. Therefore, when the input image data includes a natural image such as photograph having a relatively large size even though the input image data has a relatively small number of colors after color separation, it is appropriate to perform a compression process using a lossy compression method such as JPEG without performing a color reduction process, in the same manner as for input image data having a relatively large number of colors after color separation. When a natural image such as photograph has a relatively small size even though the input image data having a relatively small number of colors after color separation includes the natural image such as photograph, that is, when there is a relatively small influence on the effect of reducing the overall data amount due to a reduction in the compression rate of the natural image such as photograph, it is appropriate to perform a compression process using a lossless compression method after a color reduction process is performed.

Furthermore, for example, when the input image data is read image data (strictly speaking, unprocessed raw data) by an image reading apparatus such as an image scanner and the base area of the input image data is a colored base or when the input image data includes a solid color area, color unevenness may occur in the colored base or the solid color area. According to the technique disclosed in Japanese Unexamined Patent Application Laid-Open No. 2003-298853, a compression process using a lossless compression method is performed after a color reduction process is performed when the number of colors after color separation is relatively small even though the input image data has such color unevenness, in particular, color unevenness occurs over a relatively large area. However, when the input image data has color unevenness over a relatively large area even though the number of colors after color separation is relatively small, it is appropriate to perform the compression process using a lossy compression method such as JPEG without performing a color reduction process for the same reason as when the input image data includes a natural image such as photograph having a relatively large size. When the area having color unevenness is relatively small even though the color unevenness is included in the input image data having a relatively small number of colors after color separation, it is appropriate to perform a compression process using a lossless compression method after a color reduction process is performed.

That is, according to the conventional technique, it may be difficult to properly determine whether it is appropriate to execute either, so to speak, an index color process to perform a compression process using a lossless compression method after performing a color reduction process on the input image data or, so to speak, a full-color process to perform a compression process using a lossy compression method without performing a color reduction process on the input image data with the intention to reduce the data amount while preventing the deterioration of the image quality.

The present invention has an object to provide a novel image processing apparatus, a recording medium having an image processing program recorded thereon, and an image processing method so as to properly determine whether it is appropriate to perform either the index color process or the full-color process with the intention to reduce the data amount while preventing the degradation of the image quality.

SUMMARY

In order to achieve this object, the present invention includes a first invention regarding an image processing apparatus, a second invention regarding a recording medium having an image processing program recorded thereon, and a third invention regarding an image processing method.

The first invention regarding the image processing apparatus includes a color distribution degree deriver, a photograph area ratio deriver, a color uniformity area ratio deriver, and a determiner. The color distribution degree deriver derives (i.e., evaluates) a color distribution degree that is a distribution degree of pixel values of respective sets of pixel data included in input image data. The photograph area ratio deriver derives a photograph area ratio that is a ratio of photograph area pixel data forming a photograph area to all sets of the pixel data included in the input image data. The color uniformity area ratio deriver derives a color uniformity area ratio that is a ratio of color uniformity area pixel data forming a color uniformity area where the pixel values may be regarded as being uniform to all sets of the pixel data included in the input image data. The determiner determines whether it is appropriate to perform either an index color process or a full-color process based on the color distribution degree, the photograph area ratio, and the color uniformity area ratio. Here, the index color process is a process to perform a compression process using a lossless compression method after performing a color reduction process on the input image data. The full-color process is a process to perform a compression process using a lossy compression method without performing the color reduction process on the input image data.

The determiner determines that it is appropriate to perform the index color process only when, for example, the color distribution degree is less than a first reference value, the photograph area ratio is less than a second reference value, and the color uniformity area ratio is more than a third reference value. Otherwise, the determiner determines that it is appropriate to perform the full-color process.

The color distribution degree deriver may include a determination color reducer and a color distribution degree derivation executor. The determination color reducer performs a determination color reduction process using a median cut algorithm on the input image data to cut a color space, which is a coordinate space of the input image data, into subspaces corresponding to a predetermined number of colors. The color distribution degree derivation executor derives the color distribution degree based on a size of the subspace after division corresponding to the predetermined number of colors by the determination color reducer.

Further, the determination color reducer may divide the color space into an achromatic space, which may be regarded as a space having an achromatic color, and a chromatic space, which may be regarded as a space having a chromatic color, and then cut the color space including the achromatic space and the chromatic space into the above-described subspaces corresponding to the predetermined number of colors.

In addition, the determination color reducer may divide the color space into the one achromatic space and the two or more predetermined chromatic spaces and then cut the color space including the achromatic space and the chromatic spaces into the above-described subspaces corresponding to the predetermined number of colors.

Also, the photograph area ratio deriver may include, for example, an entropy deriver, a photograph area block determiner, and a photograph area ratio derivation executor. The entropy deriver derives, for each block that is a group of the pixel data in a predetermined number of units included in the input image data, an entropy that is a feature value of a histogram of pixel values of the pixel data included in the block. The photograph area block determiner determines whether, for the each block, the block is a photograph area block forming the photograph area based on the entropy. The photograph area ratio derivation executor derives, as the photograph area ratio, a ratio of a number of the photograph area blocks to a number of all the blocks.

Here, the entropy deriver may derive the entropy after excluding character area pixel data forming a character area from the pixel data included in the block.

The color uniformity area ratio deriver may include a specifier and a color uniformity area ratio derivation executor. The specifier specifies, as color uniformity pixel data, more than a predetermined number of sets of the pixel data where the pixel values may be regarded as being uniform. The color uniformity area ratio derivation executor derives, as the color uniformity area ratio, a ratio of a number of sets of the color uniformity pixel data to a number of all sets of the pixel data.

Alternatively, the specifier may specify, as color uniformity pixel data, the pixel data where the pixel value may be regarded as a value representing white. In this case, too, the color uniformity area ratio derivation executor derives, as the color uniformity area ratio, a ratio of a number of sets of the color uniformity pixel data to a number of all sets of the pixel data.

The input image data according to the first invention includes read image data by an image reading apparatus that reads an image of a document.

A second invention regarding a recording medium having an image processing program recorded thereon according to the present invention causes a computer to execute a color distribution degree derivation step, a photograph area ratio derivation step, a color uniformity area ratio derivation step, and a determination step. The color distribution degree derivation step derives a color distribution degree that is a distribution degree of pixel values of respective sets of pixel data included in input image data. The photograph area ratio derivation step derives a photograph area ratio that is a ratio of photograph area pixel data forming a photograph area to all sets of the pixel data included in the input image data. The color uniformity area ratio derivation step derives a color uniformity area ratio that is a ratio of color uniformity area pixel data forming a color uniformity area where the pixel values may be regarded as being uniform to all sets of the pixel data included in the input image data. The determination step determines whether it is appropriate to perform either an index color process or a full-color process based on the color distribution degree, the photograph area ratio, and the color uniformity area ratio. Here, the index color process is a process to perform a compression process using a lossless compression method after performing a color reduction process on the input image data as in the first invention. The full-color process is a process to perform a compression process using a lossy compression method without performing the color reduction process on the input image data.

A third invention regarding an image processing method according to the present inventions includes a color distribution degree derivation step, a photograph area ratio derivation step, a color uniformity area ratio derivation step, and a determination step. The color distribution degree derivation step derives a color distribution degree that is a distribution degree of pixel values of respective sets of pixel data included in input image data. The photograph area ratio derivation step derives a photograph area ratio that is a ratio of photograph area pixel data forming a photograph area to all sets of the pixel data included in the input image data. The color uniformity area ratio derivation step derives a color uniformity area ratio that is a ratio of color uniformity area pixel data forming a color uniformity area where the pixel values may be regarded as being uniform to all sets of the pixel data included in the input image data. The determination step determines whether it is appropriate to perform either an index color process or a full-color process based on the color distribution degree, the photograph area ratio, and the color uniformity area ratio. Here, the index color process is a process to perform a compression process using a lossless compression method after performing a color reduction process on the input image data as in the first invention and the second invention. The full-color process is a process to perform a compression process using a lossy compression method without performing the color reduction process on the input image data.

According to the present invention, it is possible to properly determine whether it is appropriate to perform either the index color process to perform a compression process using a lossless compression method after performing a color reduction process on the input image data or the full-color process to perform a compression process using a lossy compression method without performing a color reduction process on the input image data with the intention to reduce the data amount while preventing the deterioration of the image quality.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 19 is a table conceptually representing a structure of a color uniformity count table according to the third embodiment.

DETAILED DESCRIPTION

First Embodiment

Figure 1:
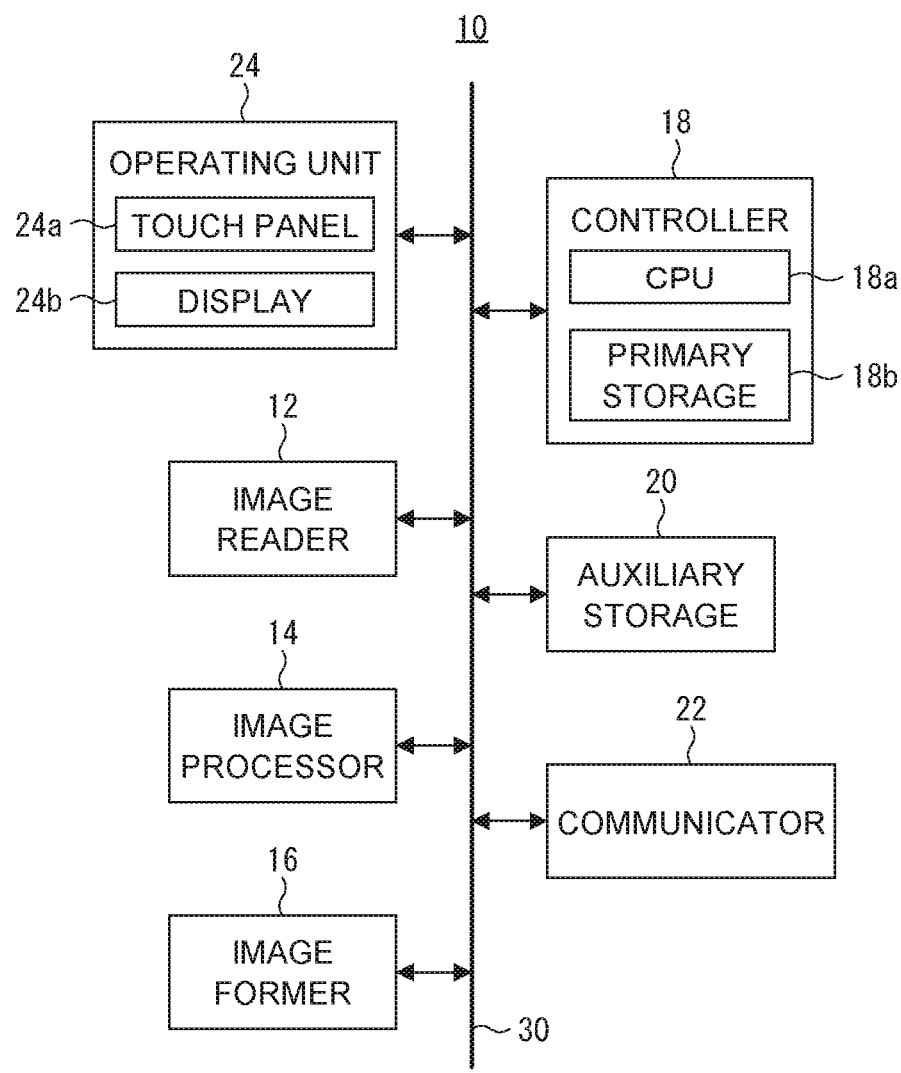
FIG. 1 is a block diagram illustrating an electrical configuration of a multifunction peripheral according to a first embodiment of the present invention.

A first embodiment of the present invention will be described by taking a multifunction peripheral 10 illustrated in FIG. 1 as an example.

The multifunction peripheral 10 according to the first embodiment has a plurality of functions, such as a copier function, a printer function, an image scanner function, and a fax function. Therefore, the multifunction peripheral 10 includes an image reader 12, an image processor 14, an image former 16, a controller 18, an auxiliary storage 20, a communicator 22, an operating unit 24, and the like. These components are connected to each other via a common bus 30.

The image reader 12 is an example of an image reader. Specifically, the image reader 12 performs an image reading process to read an image of a document (not illustrated) and output two-dimensional read image data corresponding to the image of the document. The image reader 12 includes a document placement table (not illustrated) on which the document is placed. Also, the image reader 12 includes an image reading unit including a light source, a plurality of mirrors, a lens, a line sensor, and the like, which are not illustrated. Furthermore, the image reader 12 includes a drive mechanism (not illustrated) that moves the image reading unit. In addition, the image reader 12 includes an A/D conversion circuit (not illustrated) and a shading correction circuit (not illustrated). The A/D conversion circuit converts an analog image signal, output from the line sensor, into image data that is a digital image signal. The shading correction circuit performs a shading correction process on the image data having undergone the conversion by the A/D conversion circuit to remove distortions (density unevenness) caused due to various factors including an illumination system (the light source, etc.), an optical system (the mirrors, the lens, etc.) and an imaging system (the line sensor, etc.) of the image reading unit. The image data having undergone the shading correction process is output from the image reader 12 as the read image data. The image reader 12 may include an automatic document feeder (ADF) (not illustrated), which is one of optional devices.

The image processor 14 is an example of an image processor. Specifically, the image processor 14 receives the input of various types of image data, such as the above-described read image data, and performs appropriate image processing on the image data that has been input, i.e., input image data. The image processor 14 will be described below in detail.

The image former 16 is an example of an image former. Specifically, the image former 16 performs an image forming process to form an image based on appropriate printing data on paper, which is a sheet-like image recording medium (not illustrated), i.e., execute printing. The image forming process is executed by, for example, a known electrophotographic method. Therefore, the image former 16 includes a photoreceptor drum, a charging device, an exposure device, a developing device, a transferring device, a fixing device, a cleaning device, a neutralizing device, and the like, which are not illustrated. The paper having an image formed thereon during the image forming process by the image former 16, i.e., a printed material, is ejected to a paper ejection tray (not illustrated). The image former 16 is capable of both black-and-white and color image forming processes. The image former 16 may adopt not only an electrophotographic method but also, for example, an inkjet method.

The controller 18 is an example of a controller that performs the overall control on the multifunction peripheral 10. The controller 18 includes a computer serving as a control executor, such as a CPU 18a. Also, the controller 18 includes a primary storage 18b serving as a primary storage that may be directly accessed by the CPU 18a. The primary storage 18b includes for example a ROM (not illustrated) and a RAM (not illustrated). The ROM stores a control program for controlling an operation of the CPU 18a, i.e., firmware. The RAM forms a work area and a buffer area for the process performed by the CPU 18a based on the control program.

The auxiliary storage 20 is an example of an auxiliary storage and includes, for example, a hard disk drive (not illustrated). The auxiliary storage 20 stores various types of data, such as image data having undergone image processing by the image processor 14, as needed.

The communicator 22 is an example of a communicator. The communicator 22 is connected to a communication network (not illustrated) to perform bidirectional communications via the communication network. The communication network described herein includes a LAN, the Internet, a public switched telephone network, or the like. The LAN includes a wireless LAN, and in particular, Wi-Fi (registered trademark).

The operating unit 24 includes a touch panel 24a, which is an example of an operation receiver, and a display 24b, which is an example of a display, that is, the display 24b with the touch panel 24a. Although not illustrated in detail, the touch panel 24a is a substantially transparent member having a rectangular sheet-like shape, and the display 24b includes a display surface having a substantially rectangular shape. The touch panel 24a is provided to overlap with the display surface of the display 24b and thus the display 24b with the touch panel 24a is formed. The touch panel 24a is for example a capacitive panel, but it is not limited thereto and may be other types of panels, such as an inductive panel, a resistive panel, or an infrared panel. The display 24b is for example a liquid crystal display (LCD), but it is not limited thereto and may be other types of displays, such as an organic electroluminescent (EL) display. In addition to the touch panel 24a, the operating unit 24 includes an appropriate hardware switch, such as push-button switch (not illustrated). In addition to the display 24b, the operating unit 24 also includes an appropriate light emitter such as a light-emitting diode (LED) (not illustrated).

Figure 2:
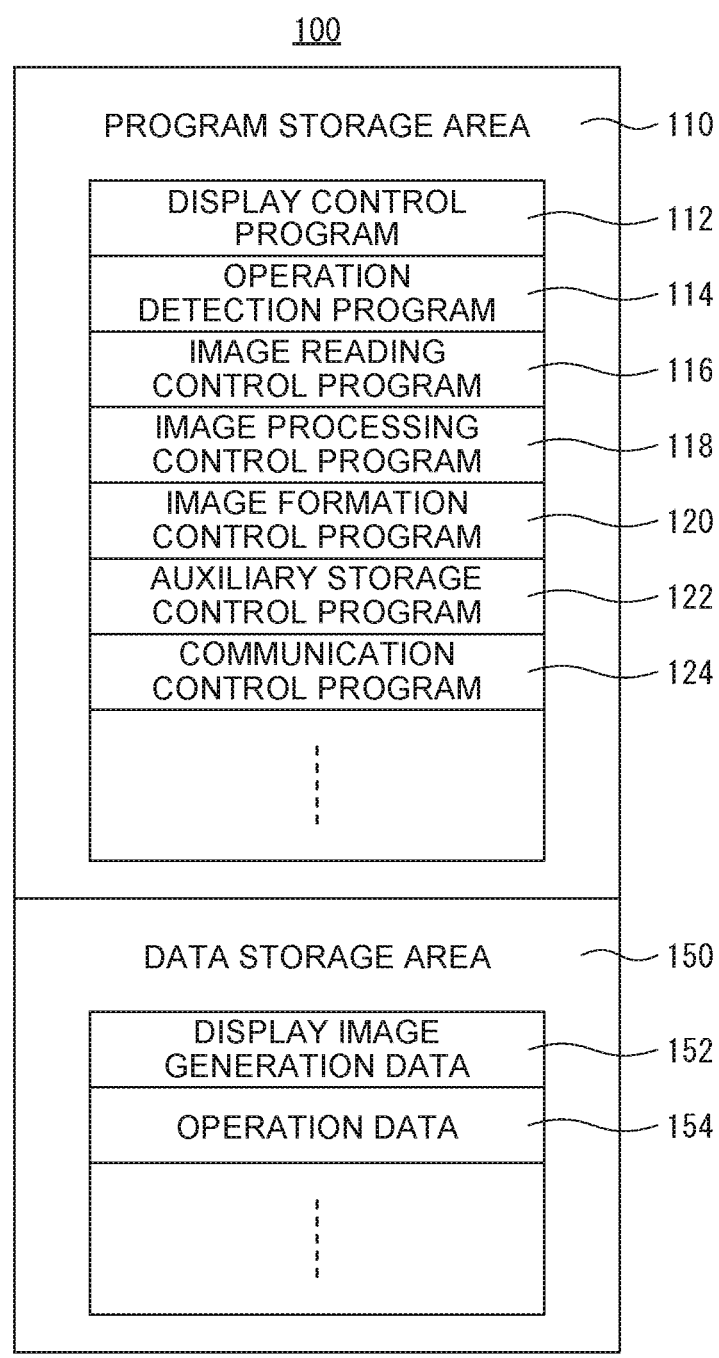
FIG. 2 illustrates a memory map conceptually representing a configuration in a RAM of a primary storage according to the first embodiment.

Here, FIG. 2 illustrates a memory map 100 conceptually representing a configuration of the RAM of the primary storage 18b. As illustrated in the memory map 100, the RAM includes a program storage area 110 and a data storage area 150.

The program storage area 110 stores the above-described control program. Specifically, the control programs include a display control program 112, an operation detection program 114, an image reading control program 116, an image processing control program 118, an image formation control program 120, an auxiliary storage control program 122, a communication control program 124, and the like.

The display control program 112 is a program to generate the display screen data needed to display various types of information, in particular, screens, on the display 24b. The operation detection program 114 is a program to detect the operating state of the touch panel 24a. The image reading control program 116 is a program to control the image reader 12. The image processing control program 118 is a program to control the image processor 14. The image formation control program 120 is a program to control the image former 16. The auxiliary storage control program 122 is a program to control the auxiliary storage 20. The communication control program 124 is a program to control the communicator 22.

The data storage area 150 stores various types of data. The various types of data include display image generation data 152 and operation data 154.

The display image generation data 152 is data such as polygon data and texture data to be used to generate the display screen data based on the display control program 112 described above. The operation data 154 is data representing the operating state for the touch panel 24a, specifically, time-series data representing the touch position (coordinates) of the user to the touch panel 24a.

In the multifunction peripheral 10 according to the first embodiment, for example, with the image scanner function, after a compression process is performed on the above-described read image data, the data having undergone the compression process, i.e., compressed file, may be output to an external unit or stored in the auxiliary storage 20. In this case, it is automatically determined which method of a compression process is appropriate in order to reduce the size of the compressed file as much as possible while preventing the degradation of the image quality caused by the compression process as much as possible.

Specifically, it is automatically determined whether it is appropriate to perform either an index color process to perform a compression process using a lossless compression method after performing a color reduction process on the read image data or a full-color process to perform a compression process using a lossy compression method without performing a color reduction process on the read image data. For example, the compression process using the Deflate method is adopted as a compression process using a lossless compression method. For example, the compression process using the JPEG method is adopted as a compression process using a lossy compression method.

More specifically, first, a color distribution degree, which is a distribution degree (dispersion degree) of the pixel values of the respective sets of pixel data included in the read image data, is derived. Also, a photograph area ratio, which is a ratio of the photograph area pixel data forming the photograph area to all sets of pixel data included in the read image data, is derived. Further, a white base area ratio, which is a ratio of the white base area pixel data forming the area where the pixel value may be regarded as a value representing white, i.e., the white base area, to all sets of pixel data included in the read image data, is derived. It is determined that the index color process is appropriate only when all of the following three conditions are satisfied: a first condition in which the color distribution ratio is less than a first reference value; a second condition in which the photograph area ratio is less than a second reference value; and a third condition in which the white base area ratio is more than a third reference value. Conversely, when at least one of the three conditions is not satisfied, it is determined that the full-color process is appropriate.

Figure 3:
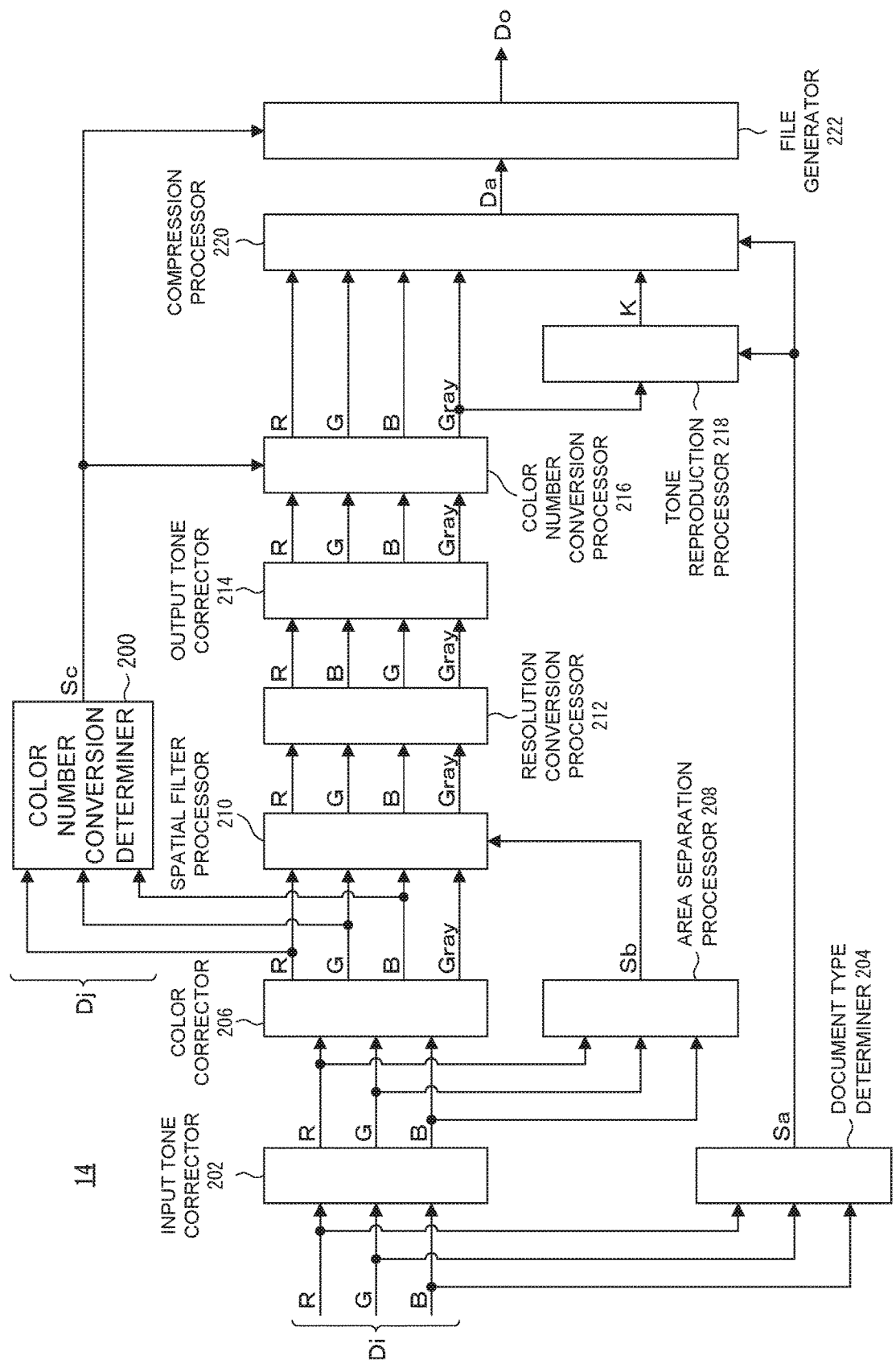
FIG. 3 is a block diagram illustrating a detailed configuration of an image processor for an image scanner function according to the first embodiment.

To perform, so to speak, an automatic determination function, the image processor 14 includes a color number conversion determiner 200, as illustrated in for example FIG. 3. FIG. 3 illustrates a detailed configuration of the image processor 14 regarding the image scanner function. With this configuration, the read image data (raw data) output from the image reader 12, specifically, full color (true color) RGB image data having the total of 24 bits, i.e., 8 bits representing each of the respective component values of R, G, and B, is input to the image processor 14.

As illustrated in FIG. 3, the image processor 14 includes an input tone corrector 202 to input the RGB image data to the input tone corrector 202 as input image data Di for the image processor 14. The input tone corrector 202 performs an appropriate input tone correction process, such as a color balance adjustment process, a base density adjustment (base removal) process, or a contrast adjustment process, on the RGB image data as the input image data Di. The image data having undergone the process by the input tone corrector 202 is input to a color corrector 206 and an area separation processor 208.

The RGB image data as the input image data Di is input to a document type determiner 204. The document type determiner 204 performs a document type determination process to determine whether an image based on the input image data Di, i.e., an input image, is an image primarily including any of a character, photograph, and graphic (figure) or an image including a mixture of them. Then, the document type determiner 204 outputs a document type signal Sa indicating a result of the document type determination process. The document type signal Sa is input to a tone reproduction processor 218 and a compression processor 220 described below.

The color corrector 206 performs a color correction process on the image data input from the input tone corrector 202 to enhance the color reproducibility. Also, the color corrector 206 generates gray (grayscale) data indicating a luminance component of the image data based on the image data input from the input tone corrector 202. The image data having undergone the process by the color corrector 206 and including the gray data is input to a spatial filter processor 210 described below. The image data having undergone the process by the color corrector 206, specifically the image data excluding the gray data, is input to the color number conversion determiner 200.

The area separation processor 208 performs an area determination process to determine which one of a character area, photograph area, graphic area, and base area is formed by each set of pixel data included in the image data input from the input tone corrector 202. Then, the area separation processor 208 outputs an area determination signal Sb indicating a result of the area determination process. The area determination signal Sb is input to the spatial filter processor 210 described below.

The spatial filter processor 210 performs an appropriate spatial filter process on the image data input from the color corrector 206 to correct the spatial frequency characteristics of the image data. In this case, the spatial filter processor 210 performs the spatial filter process corresponding to the type of area on each area indicated by the area determination signal Sb. For example, the character area is subjected to an edge enhancement process (sharpness enhancement process) to enhance its high-frequency components. Accordingly, an edge portion of the character included in the character area is enhanced and the blurring of the character is reduced. As a result, the reproducibility of the character is improved. The graphic area is subjected to a smoothing process to remove its input halftone component. The photograph area is subjected to an adaptive mixture filter process to moderately enhance the low-frequency components while moderately smoothing the high-frequency components. The base area is also subjected to the same process as that for the photograph area. The image data having undergone the process by the spatial filter processor 210 is input to a resolution conversion processor 212 described below.

The color number conversion determiner 200 is provided to perform the automatic determination function as described above. Specifically, the color number conversion determiner 200 determines whether it is appropriate to perform either the index color process or the full-color process. Then, the color number conversion determiner 200 outputs a color number conversion determination signal Sc indicating the determination result obtained by itself. The color number conversion determination signal Sc is input to a color number conversion processor 216 and a file generator 222 described below. The color number conversion determiner 200 will be described below in detail.

The resolution conversion processor 212 performs a resolution conversion process on the image data input from the spatial filter processor 210 to convert the resolution in accordance with setting operation content for the resolution by the operating unit 24, strictly speaking, an instruction from the CPU 18a. The image data having undergone the resolution conversion process by the resolution conversion processor 212 is input to an output tone corrector 214.

The output tone corrector 214 performs an appropriate output tone correction process, such as a gamma correction process, on the image data input from the resolution conversion processor 212. The image data having undergone the process by the output tone corrector 214 is input to the color number conversion processor 216.

The color number conversion processor 216 performs a color reduction process on the image data input from the output tone corrector 214 as needed, specifically, when the color number conversion determination signal Sc input from the color number conversion determiner 200 indicates that it is appropriate to perform the index color process. The color reduction process is performed by for example a known median cut algorithm. The color reduction process converts the image data into index color image data having for example 20 colors. The index color image data having undergone the color reduction process (having undergone the color number conversion process) is input to the compression processor 220. The number of colors for reduction, 20 colors, is the upper limit of the number of colors with which, when it is assumed that the index color process is performed, it is expected that the size of the compressed file may be sufficiently reduced as compared to the full-color process while the deterioration of the image quality is prevented, and the number is what is called an empirical value derived from various experiments. In some situations, however, a different number of colors for reduction may be used, such as 32 colors.

Conversely, when the color number conversion determination signal Sc input from the color number conversion determiner 200 indicates that it is appropriate to perform the full-color process, the color number conversion processor 216 does not perform the color reduction process on the image data input from the output tone corrector 214, but outputs (through) the image data as it is. In this case, too, the image data output from the color number conversion processor 216, so to speak, the full-color image data that is not subjected to the color reduction process by the color number conversion processor 216, is input to the compression processor 220. The gray data included in the image data output from the color number conversion processor 216 is also input to the tone reproduction processor 218.

The tone reproduction processor 218 performs a tone reproduction process (halftone generation process) to binarize the gray data input from the color number conversion processor 216 and generate K (key plate) data. In that case, the tone reproduction processor 218 performs the tone reproduction process in accordance with the document type indicated by the document type signal Sa. The K data generated during the tone reproduction process of the tone reproduction processor 218 is input to the compression processor 220.

The compression processor 220 performs an appropriate compression process on the image data input from the color number conversion processor 216. For example, when the image data input from the color number conversion processor 216 is index color image data, the compression processor 220 performs a compression process using the Deflate method on the index color image data. On the other hand, when the image data input from the color number conversion processor 216 is full-color image data, the compression processor 220 performs a compression process using the JPEG method on the full-color image data. During the compression process using the JPEG method, the compression processor 220 performs the compression process based on the document type indicated by the document type signal Sa. Image data Da having undergone the compression process by the compression processor 220 is input to the file generator 222.

Although there is no direct relevance to the present invention, for example, when the input image data Di is data of a monochrome document, the compression processor 220 performs the compression process using the JPEG method on the gray data. An auto color selection (ACS) processor (not illustrated) determines whether the input image data Di is data of a monochrome document. When the monochrome output setting is set (by an operation of the operating unit 24) even though the input image data Di is data of a color document, the compression processor 220 performs a compression process using the JPEG method on the gray data in the same manner for the monochrome document. When the binary output setting is set, which is one type of monochrome output, the compression processor 220 performs the compression process using the MMR method on the K data.

The file generator 222 forms the image data Da, input from the compression processor 220, into a file having a predetermined format, for example, a file having a PDF format. Specifically, when the image data Da is data having undergone the compression process using the Deflate method, the PDF file including the image data Da having undergone the compression process using the Deflate method is generated. When the image data Da is data having undergone the compression process using the JPEG method, the PDF file including the image data Da having undergone the compression process using the JPEG method is generated. Furthermore, when the image data Da is data having undergone the compression process using the MMR method, the PDF file including the image data Da having undergone the compression process using the MMR method is generated. The PDF file generated by the file generator 222, i.e., the compressed file, is output as output data Do of the image processor 14.

The compressed file (the output data Do) output from the image processor 14 is output to, for example, an external unit of the multifunction peripheral 10 or stored (saved) in the auxiliary storage 20. In particular, the compressed file, which is output to an external unit of the multifunction peripheral 10, is transmitted to an external device (not illustrated) such as a personal computer or a server or is stored in an external storage medium (not illustrated) such as a USB memory.

Figure 4:
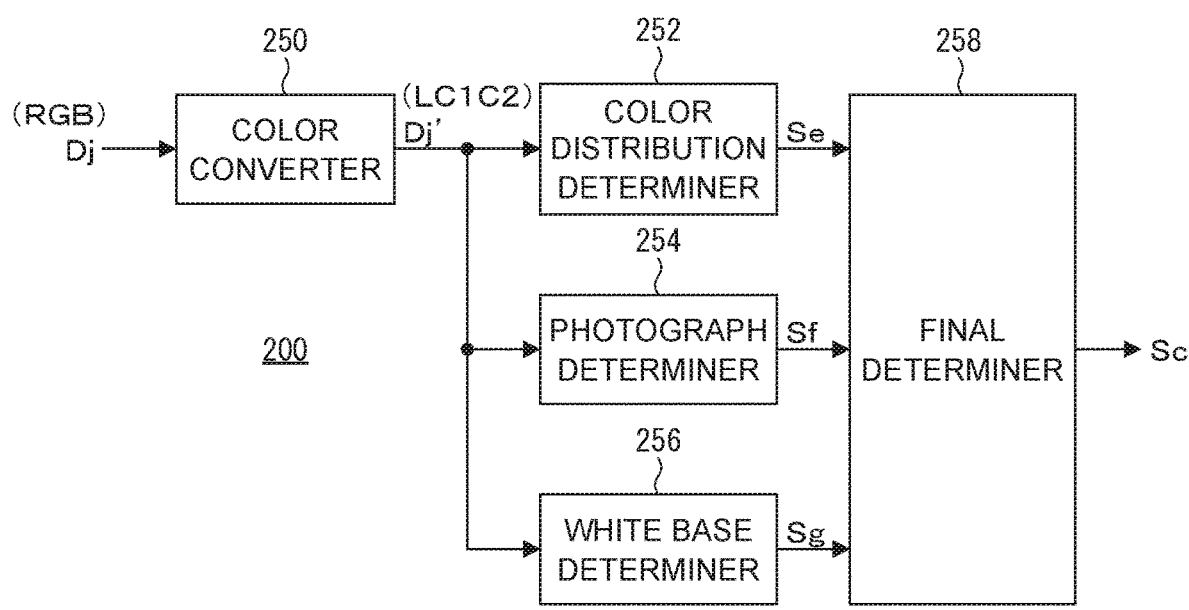
FIG. 4 is a block diagram illustrating a detailed configuration of a color number conversion determiner according to the first embodiment.

As described above, the color number conversion determiner 200 is provided to perform the automatic determination function, that is, determine whether it is appropriate to perform either the index color process or the full-color process. FIG. 4 illustrates a detailed configuration of the color number conversion determiner 200.

As illustrated in FIG. 4, the color number conversion determiner 200 includes a color converter 250, and the image data having undergone the correction by the color corrector 206, i.e., the RGB image data as input image data Dj to the color number conversion determiner 200, is input to the color converter 250. The color converter 250 converts the RGB image data serving as the input image data Dj into LC1C2 format image data Dj'. Here, the LC1C2 format image data is image data including a luminance L and two color-related elements C1 and C2 other than the luminance L, and is for example CIELAB (hereinafter simply referred to as "LAB") format image data that is one of the uniform color spaces. The image data Dj' having undergone the conversion by the color converter 250 is input to a color distribution determiner 252, a photograph determiner 254, and a white base determiner 256.

The color distribution determiner 252 is, so to speak, a first determiner that determines whether the above-described first condition is satisfied. Specifically, the color distribution determiner 252 derives the color distribution degree, which is a distribution degree of the pixel values of the respective sets of pixel data included in the image data Dj' and determines whether the first condition, in which the color distribution degree is less than the first reference value, is satisfied. In this case, the color distribution determiner 252 performs a color reduction process for determination as described below. Then, the color distribution determiner 252 outputs a first determination signal Se indicating the determination result obtained by itself. The first determination signal Se is input to a final determiner 258 described below.

The photograph determiner 254 is, so to speak, a second determiner that determines whether the above-described second condition is satisfied. Specifically, the photograph determiner 254 derives the photograph area ratio, which is the ratio of the photograph area pixel data forming the photograph area to all sets of pixel data included in the image data Dj' and determines whether the second condition, in which the photograph area ratio is less than the second reference value, is satisfied. In this case, in particular, to detect the photograph area, the photograph determiner 254 uses the technique disclosed in U.S. Pat. No. 4,527,127 described below. Then, the photograph determiner 254 outputs a second determination signal Sf indicating the determination result obtained by itself. The second determination signal Sf is also input to the final determiner 258 described below.

The white base determiner 256 is, so to speak, a third determiner that determines whether the above-described third condition is satisfied. Specifically, the white base determiner 256 derives the white base area ratio, which is the ratio of the white base area pixel data forming the white base area to all sets of pixel data included in the image data Dj' and determines the third condition, in which the white base area ratio is more than the third reference value, is satisfied. Then, the white base determiner 256 outputs a third determination signal Sg indicating the determination result obtained by itself. The third determination signal Sg is also input to the final determiner 258.

The final determiner 258 is a final determiner that finally determines whether it is appropriate to perform either the index color process or the full-color process based on the first determination signal Se, the second determination signal Sf, and the third determination signal Sg, that is, based on whether the first condition, the second condition, and the third conditions are each satisfied. For example, the final determiner 258 determines that the index color process is appropriate only when the first condition, the second condition, and the third condition are all satisfied. Otherwise, that is, when at least one of the first condition, the second condition, and the third condition is not satisfied, the final determiner 258 determines that the full-color process is appropriate. Then, the final determiner 258 outputs the color number conversion determination signal Sc indicating the determination result by using the final determination result obtained by itself as the determination result of the entire color number conversion determiner 200. The color number conversion determination signal Sc is input to the compression processor 220 and the file generator 222 as described above.

Figure 5:
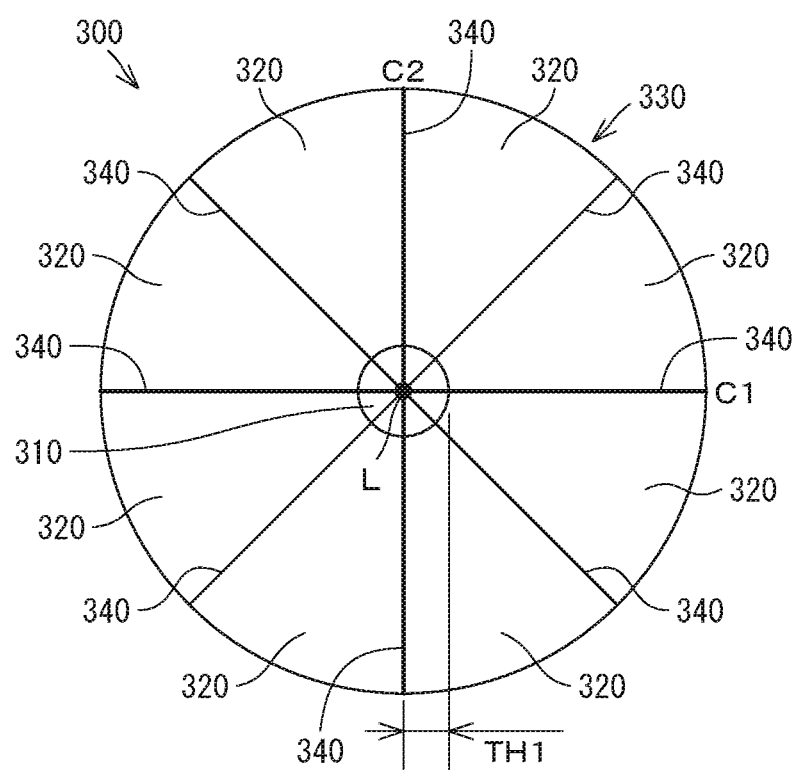
FIG. 5 is a diagram illustrating the manner of a color distribution determination process by a color distribution determiner according to the first embodiment.

The color distribution determiner 252 will be described in more detail. The color distribution determiner 252 performs the color reduction process for determination as described above, and also performs for example the color reduction process using the median cut algorithm for determination. In this case, as illustrated in FIG. 5, the color distribution determiner 252 divides an LC1C2 color space 300, which is a coordinate space of the image data Dj' input to the color distribution determiner 252, into one achromatic space 310 and a plurality of, for example, eight, chromatic spaces 320, 320, . . . FIG. 5 illustrates the LC1C2 color space 300 when viewed from the direction along an L axis, that is, the LC1C2 color space 300 when a C1-C2 plane extends along the paper surface of FIG. 5. The L value in the LC1C2 color space 300 is for example "0" to "100". The C1 value and the C2 value are each, for example, "−128" to "128".

Specifically, the color distribution determiner 252 defines the cylindrical inner portion 310 having a radius TH1 around the L axis in the LC1C2 color space 300 as an achromatic space that may be regarded as a space having an achromatic color. The radius TH1 described herein is a value sufficiently smaller than the respective maximum values (=128) of the C1 value and the C2 value (strictly speaking, the absolute values |C1| and |C2|), for example "6", but is not limited thereto.

Also, the color distribution determiner 252 defines a portion 330 other than the achromatic space 310 in the LC1C2 color space 300 as a chromatic space that may be regarded as a space having a chromatic color. Further, the color distribution determiner 252 equally divides the chromatic space 330 by eight planes 340, 340, . . . , which extend radially from the L axis and are perpendicular to the C1-C2 plane, to define the eight segmentalized chromatic spaces 320, 320, . . . , having the shape of a fan-like column. Two of the eight planes 340, 340, . . . are provided to include the C1 axis. Another two of the eight planes 340, 340, . . . are provided to include the C2 axis.

Figure 6:
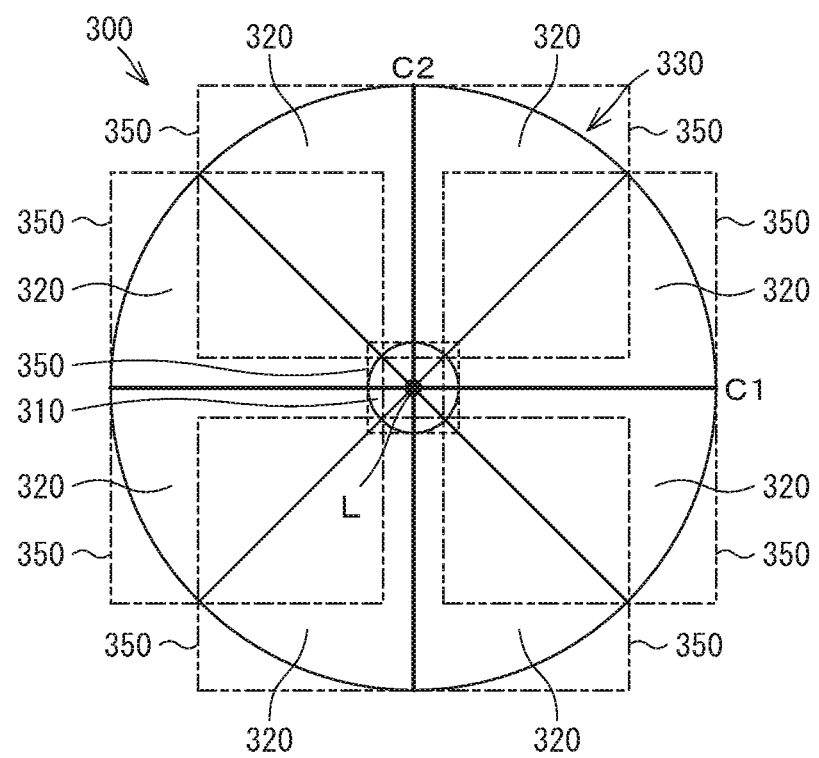
FIG. 6 is another diagram illustrating the manner of the color distribution determination process by the color distribution determiner according to the first embodiment.

Then, the color distribution determiner 252 assigns the pixel values of the respective sets of pixel data included in the image data Dj' to the LC1C2 color space 300. Then, in the achromatic space 310 and the chromatic spaces 320, 320, . . . , as indicated by a dashed line, a dashed-dotted line, and a dashed-two dotted line in FIG. 6, the color distribution determiner 252 virtualizes a cuboidal (cubic) subspace 350 including the pixel values of all sets of pixel data assigned thereto, that is, virtualizes the nine subspaces 350, 350, . . . in total. Although FIG. 6 illustrates an example of the case where each of the subspaces 350 has the maximum size, the size of each of the subspaces 350 varies depending on the distribution state of the pixel values of the respective sets of pixel data included in the image data Dj'.

Each of the subspaces 350 is described from a different perspective; first, with regard to the achromatic space 310 and each of the chromatic spaces 320, 320, . . . , the maximum value and the minimum value of the respective component values of L, C1, and C2 of the pixel values of all sets of pixel data assigned thereto are obtained. Then, a first plane that includes the maximum value of the L value and that is perpendicular to the L axis and a second plane that includes the minimum value of the L value and that is perpendicular to the L axis are virtualized. Also, a third plane that includes the maximum value of the C1 value and that is perpendicular to the C1 axis and a fourth plane that includes the minimum value of the C1 value and that is perpendicular to the C1 axis are virtualized. Further, a fifth plane that includes the maximum value of the C2 value and that is perpendicular to the C2 axis and a sixth plane that includes the minimum value of the C2 axis and that is perpendicular to the C2 axis are virtualized. The cuboidal spaces surrounded by the first plane, the second plane, the third plane, the fourth plane, the fifth plane, and the sixth plane are virtualized as the subspaces 350.

Then, the color distribution determiner 252 performs a color reduction process in a manner similar to the known median cut algorithm. That is, the color distribution determiner 252 calculates the maximum value and the minimum value of the respective component values of L, C1, and C2 with regard to each of the subspaces 350, 350, . . . . Then, the color distribution determiner 252 specifies the subspace 350 having the maximum mutual difference (=the maximum value−the minimum value) between the maximum value and the minimum value of the component values regardless of any of the component values of L, C1, and C2. Further, the color distribution determiner 252 cuts the specified subspace 350 by half, specifically, cuts it such that the mutual difference between the component values is reduced by half, for which the mutual difference between the maximum value and the minimum value of the component values of L, C1, and C2 is the maximum.

Figure 7A:
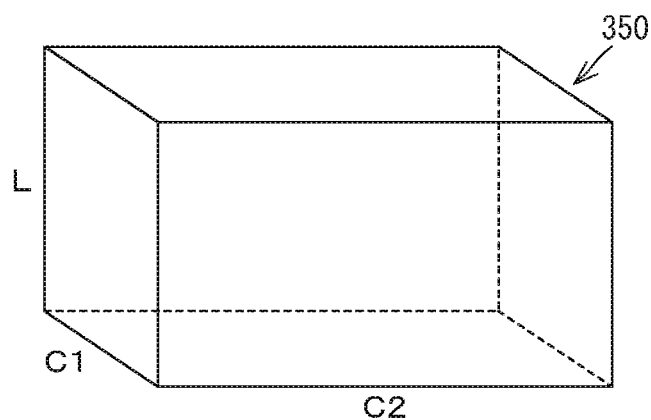
FIGS. 7A and 7B are further another diagram illustrating the manner of the color distribution determination process by the color distribution determiner according to the first embodiment.
Figure 7B:
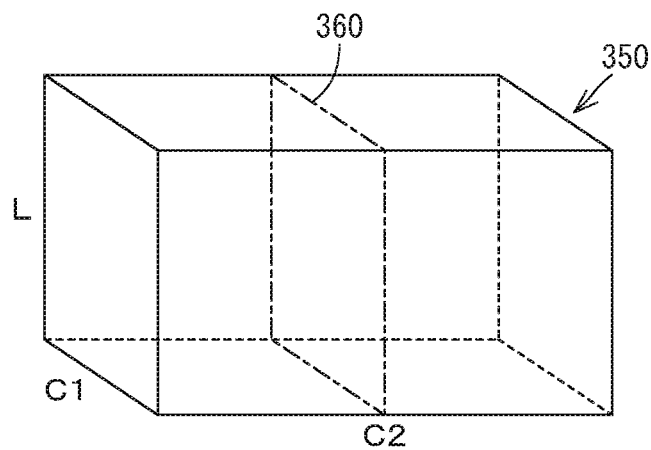

The manner of cutting the subspace 350 is described from a different perspective; as illustrated in FIG. 7A, the subspace 350 is virtualized as a cuboidal space having the side along the L axis, the side along the C1 axis, and the side along the C2 axis. Then, regardless of any of the side along the L axis, the side along the C1 axis, and the side along the C2 axis, the subspace 350 having the longest side is specified. Then, as indicated by a dashed-dotted line 306 in FIG. 7B, the subspace 350 having the longest side is cut such that the length of the longest side of the subspace 350 is reduced by half. FIG. 7B illustrates an example of the case where the side along the C2 axis is longest and the subspace 350 is cut by half such that the length of the side along the C2 axis is reduced by half.

In this manner, the color distribution determiner 252 cuts the subspace 350 having the longest side each time until the total number of the subspaces 350 reaches a predetermined number N. The predetermined number N described herein is the same as, so to speak, the number of colors for reduction in the color reduction process for compression by the color number conversion processor 216 described above (FIG. 3), that is, "20". Then, when the total number of the subspaces 350 reaches the predetermined number N, the color distribution determiner 252 specifies the subspace 350 having the longest side among the N subspaces 350, 350, . . . . Then, the color distribution determiner 252 compares the length of the longest side of the specified subspace 350 with a predetermined threshold TH2.

Here, for example, it is assumed that the length of the longest side of the specified subspace 350 is shorter than the predetermined threshold TH2. In this case, the color distribution determiner 252 determines that, even when the color reduction process for compression is performed by the above-described color number conversion processor 216 or even when the index color process including the color reduction process is performed, the image quality (color shade) does not deteriorate much, in other words, the deterioration of the image quality falls within an acceptable range. Thus, the color distribution determiner 252 determines that the first condition is satisfied.

Conversely, it is assumed that the length of the longest side of the specified subspace 350 is equal to or more than the predetermined threshold TH2. In this case, the color distribution determiner 252 determines that the image quality may largely deteriorate when the color number conversion processor 216 performs the color reduction process for compression. In other words, the color distribution determiner 252 determines that it is not appropriate to perform the color reduction process for compression by the color number conversion processor 216 and thus it is not appropriate to perform the index color process including the color reduction process. Thus, the color distribution determiner 252 determines that the first condition is not satisfied.

That is, the color distribution determiner 252 estimates the color distribution degree of the image data Dj', i.e., indirectly derives the color distribution degree, based on the length of the longest side of the subspace 350 having the longest side. Also, the color distribution determiner 252 handles the predetermined threshold TH2 described herein as the first reference value. Then, the color distribution determiner 252 determines whether the first condition is satisfied based on whether the length of the longest side of the subspace 350 having the longest side is shorter than the predetermined threshold TH2. The predetermined threshold TH2 is determined as appropriate by experience such as experiment.

As described above, the color distribution determiner 252 outputs the first determination signal Se indicating the determination result obtained by itself. The first determination signal Se is then input to the final determiner 258.

Figure 8:
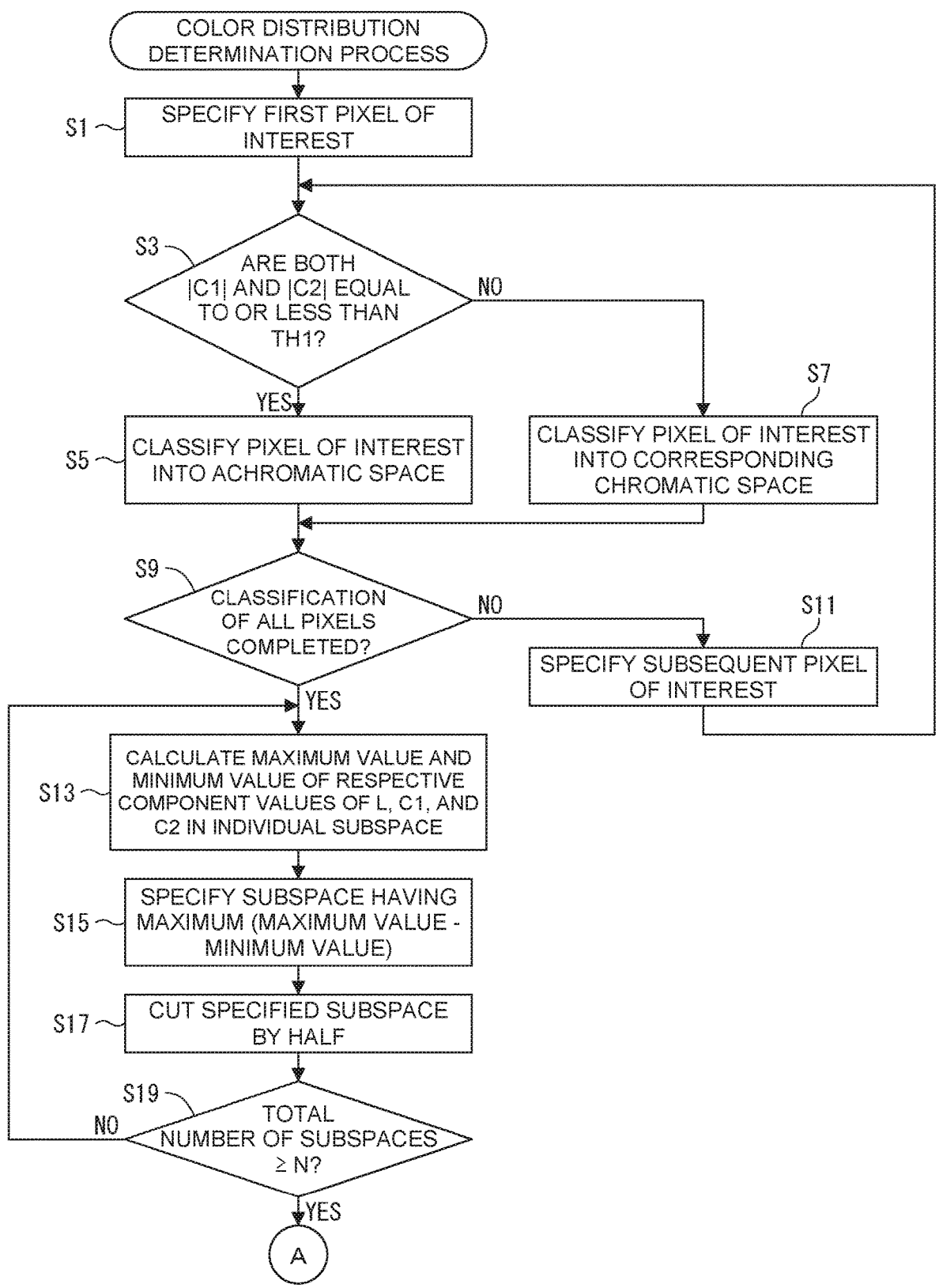
FIG. 8 is a flowchart illustrating part of a flow of the color distribution determination process by the color distribution determiner according to the first embodiment.
Figure 9:
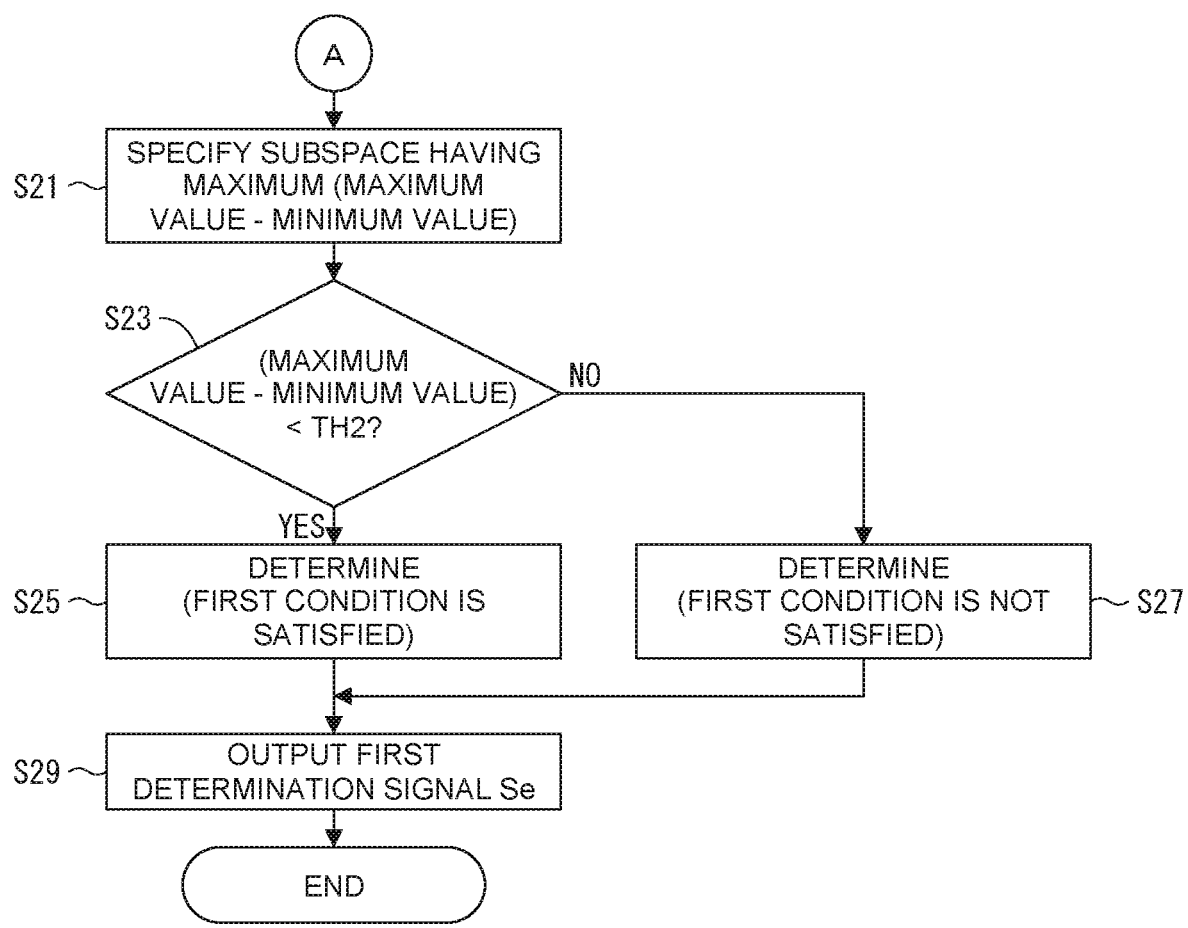
FIG. 9 is a flowchart illustrating the remaining part of the flow of the color distribution determination process by the color distribution determiner according to the first embodiment.

FIGS. 8 and 9 illustrate the flow of the series of processes, i.e., a color distribution determination process, by the color distribution determiner 252.

During the color distribution determination process, at Step S1, the color distribution determiner 252 first focuses on first (leading) pixel data included in the image data Dj', i.e., specifies a first pixel of interest of the image based on the image data Dj'. Then, the color distribution determiner 252 proceeds to the process at Step S3.

At Step S3, the color distribution determiner 252 determines whether the absolute value |C1| of the C1 value and the absolute value |C2| of the C2 value of the pixel (pixel data) of interest are both equal to or less than the radius TH1 of the achromatic space 310, that is, determines whether the pixel value of the pixel of interest belongs to the achromatic space 310. Here, for example, when the absolute value |C1| of the C1 value and the absolute value |C2| of the C2 value of the pixel of interest are both equal to or less than the radius TH1 of the achromatic space 310 (S3: YES), the color distribution determiner 252 proceeds to the process at Step S5. Conversely, when either the absolute value |C1| of the C1 value or the absolute value |C2| of the C2 value of the pixel of interest is more than the radius TH1 of the achromatic space 310 (S3: NO), the color distribution determiner 252 proceeds to the process at Step S7 described below.

At Step S5, the color distribution determiner 252 classifies the pixel of interest into the achromatic space 310, strictly speaking, assigns the pixel of interest to a coordinate position in the achromatic space 310. Then, the color distribution determiner 252 proceeds to the process at Step S9.

Conversely, when the process proceeds from the above-described Step S3 to Step S7, the color distribution determiner 252 classifies, at Step S7, the pixel of interest into a corresponding space among the eight chromatic spaces 320, 320, . . . , strictly speaking, assigns the pixel of interest to a coordinate position in the corresponding chromatic space 320. Then, the color distribution determiner 252 proceeds to the process at Step S9.

At Step S9, the color distribution determiner 252 determines whether the classification of all the pixels included in the image data Dj' into any of the achromatic space 310 and the chromatic spaces 320, 320, . . . has been completed. Here, for example, when the classification of all the pixels has been completed (S9: YES), the color distribution determiner 252 proceeds to the process at Step S13 described below. Conversely, when the classification of all the pixels has not been completed (S9: NO), the color distribution determiner 252 proceeds to the process at Step S11.

At Step S11, the color distribution determiner 252 specifies the subsequent pixel of interest included in the image data Dj'. Then, the color distribution determiner 252 returns to the process at Step S3.

Conversely, when the process proceeds from the above-described Step S9 to Step S13, the color distribution determiner 252 calculates, at Step S13, the maximum value and the minimum value of the respective component values of L, C1, and C2 in the individual subspace 350. Then, the color distribution determiner 252 proceeds to the process at Step S15.

At Step S15, the color distribution determiner 252 specifies the subspace 350 having the maximum mutual difference (=the maximum value−the minimum value) between the maximum value and the minimum value of the component values regardless of any of the component values of L, C1, and C2. In other words, the color distribution determiner 252 specifies the subspace 350 having the longest side. Then, the color distribution determiner 252 proceeds to the process at Step S17.

At Step S17, the color distribution determiner 252 cuts the subspace 350 specified at Step S15 by half, specifically, cuts it such that the mutual difference between the component values is reduced by half, for which the mutual difference between the maximum value and the minimum value of the component values of L, C1, and C2 is the maximum. In other words, the color distribution determiner 252 cuts the subspace 350 having the longest side such that the length of the longest side of the subspace 350 is reduced by half. Then, the color distribution determiner 252 proceeds to the process at Step S19.

At Step S19, the color distribution determiner 252 determines whether the total number of the subspaces 350 has reached the above-described predetermined number N. Here, for example, when the total number of the subspaces 350 has not reached the predetermined number N (S19: NO), the color distribution determiner 252 returns to the process at Step S13. Conversely, when the total number of the subspaces 350 has reached the above-described predetermined number N (S19: YES), the color distribution determiner 252 proceeds to the process at Step S21.

At Step S21, the color distribution determiner 252 specifies the subspace 350 having the maximum mutual difference (=the maximum value−the minimum value) between the maximum value and the minimum value of the component values regardless of any of the component values of L, C1, and C2, that is, specifies the subspace 350 having the longest side, in the same manner as Step S15 described above. Then, the color distribution determiner 252 proceeds to the process at Step S23.

At Step S23, the color distribution determiner 252 determines whether the above-described mutual difference (=the maximum value−the minimum value) in the subspace 350 specified at Step S21 is less than the predetermined threshold TH2, i.e., determines whether the length of the longest side of the subspace 350 is shorter than the predetermined threshold TH2. Here, for example, when the mutual difference (=the maximum value−the minimum value) is less than the predetermined threshold TH2, i.e., when the length of the longest side of the subspace 350 having the longest side is shorter than the predetermined threshold TH2 (S23: YES), the color distribution determiner 252 proceeds to the process at Step S25. Conversely, when the mutual difference (=the maximum value−the minimum value) is equal to or more than the predetermined threshold TH2, i.e., when the length of the longest side of the subspace 350 having the longest side is equal to or more than the predetermined threshold TH2 (S23: NO), the color distribution determiner 252 proceeds to the process at Step S27 described below.

At Step S25, the color distribution determiner 252 determines that the first condition is satisfied. Then, the color distribution determiner 252 proceeds to the process at Step S29.

Conversely, when the process proceeds from the above-described Step S23 to Step S27, the color distribution determiner 252 determines, at Step S27, that the first condition is not satisfied. Then, the color distribution determiner 252 proceeds to the process at Step S29.

At Step S29, the color distribution determiner 252 outputs the first determination signal Se indicating the determination result at Step S25 or S27. Then, the color distribution determiner 252 ends the series of color distribution determination processes.

Next, the photograph determiner 254 will be described in detail. As described above, the photograph determiner 254 derives the photograph area ratio, which is the ratio of the photograph area pixel data forming the photograph area to all sets of pixel data included in the image data Dj' and determines whether the second condition, in which the photograph area ratio is less than the second reference value, is satisfied. In this case, in particular, to detect the photograph area, the photograph determiner 254 uses the technique disclosed in Japanese Patent No. 4527127.

Specifically, the photograph determiner 254 divides all sets of pixel data included in the image data Dj' into a plurality of blocks. The block described herein is a group of pixel data in a predetermined number of units of m×n (m and n are both integers equal to or more than 2), i.e., a group of pixels including the m×n pixels. For example, m×n is 11×11 (i.e., m=11 and n=11).

Then, for each block, the photograph determiner 254 detects the portion of a character included in the block, i.e., detects the character area pixel data forming the character area. The detection of the character area pixel data is executed by a known character detection process including, for example, an appropriate edge detection process and smoothing process.

Further, for each block, the photograph determiner 254 calculates a histogram entropy E in the block after excluding the character portion detected during the character detection process. The histogram entropy E is an index obtained by quantifying the feature value of the histogram of the pixel value of each pixel in the block (excluding the character portion) and indicates, so to speak, the degree (probability) with which the block may be regarded as forming a photograph area. The histogram entropy E is calculated by the following Equation 1. In Equation 1, i is the number of a bin of the histogram. Further, h(i) is the frequency (number of times) for the bin with the number i. Moreover, p(i) is the normalized frequency.

$$E = -\Sigma p(i) \log_2 \{p(i)\} \qquad \text{Equation 1}$$

where $p(i) = \{h(i)\}/\{\Sigma h(i)\}$ i=0 to L−1

According to the histogram entropy E calculated by Equation 1, the larger the absolute value |E| of the histogram entropy E, the higher the degree with which the corresponding block may be regarded as forming the photograph area. By using this fact, the photograph determiner 254 determines whether each block is a photograph area block forming a photograph area, i.e., detects a photograph area in the image based on the image data Dj'. For example, the photograph determiner 254 compares the absolute value |E| of the histogram entropy E with a predetermined threshold TH4 and, when the absolute value |E| is more than the predetermined threshold TH4, determines that the block regarding the histogram entropy E is a photograph area block. Conversely, when the absolute value |E| of the histogram entropy E is equal to or less than the predetermined threshold TH4, the photograph determiner 254 determines that the block regarding the histogram entropy E is not a photograph area block. The predetermined threshold TH4 is determined as appropriate by experience such as experiment.

In this manner, the photograph determiner 254 determines whether all the blocks are photograph area blocks. The photograph determiner 254 then derives, as the photograph area ratio, the ratio of the number of photograph area blocks to the number of all the blocks.

Further, the photograph determiner 254 compares the photograph area ratio with a predetermined threshold TH5. Here, for example, it is assumed that the photograph area ratio is less than the predetermined threshold TH5. In this case, the photograph determiner 254 recognizes that the size of the photograph area in the image based on the image data Dj' is relatively small. Then, the photograph determiner 254 determines that, even when the index color process is performed on the image data Dj' (strictly speaking, the input image data Di), there is a relatively small effect on the compression rate of the entire image due to a decrease in the compression rate in the photograph area, in other words, a desired (high) compression rate may be obtained for the entire image. Thus, the photograph determiner 254 determines that the second condition is satisfied.

On the other hand, it is assumed that the photograph area ratio is equal to or more than the predetermined threshold TH5. In this case, the photograph determiner 254 recognizes that the image based on the image data Dj' includes a photograph area having a relatively large size. Then, the photograph determiner 254 determines that, when the index color process is performed on the image data Dj' (strictly speaking, the input image data Di), the compression rate of the entire image also decreases due to a large decrease in the compression rate of the photograph area, and thus a desired compression rate of the entire image is not obtained. Thus, the photograph determiner 254 determines that the second condition is not satisfied.

Specifically, the photograph determiner 254 handles the predetermined threshold TH5 described herein as the second reference value. Then, the photograph determiner 254 determines whether the second condition is satisfied based on whether the photograph area ratio is less than the predetermined threshold TH5. The predetermined threshold TH5 is determined as appropriate by experience such as experiment and is for example 20%.

As described above, the photograph determiner 254 outputs the second determination signal Sf indicating the determination result obtained by itself. Then, the second determination signal Sf is input to the final determiner 258.

Figure 10:
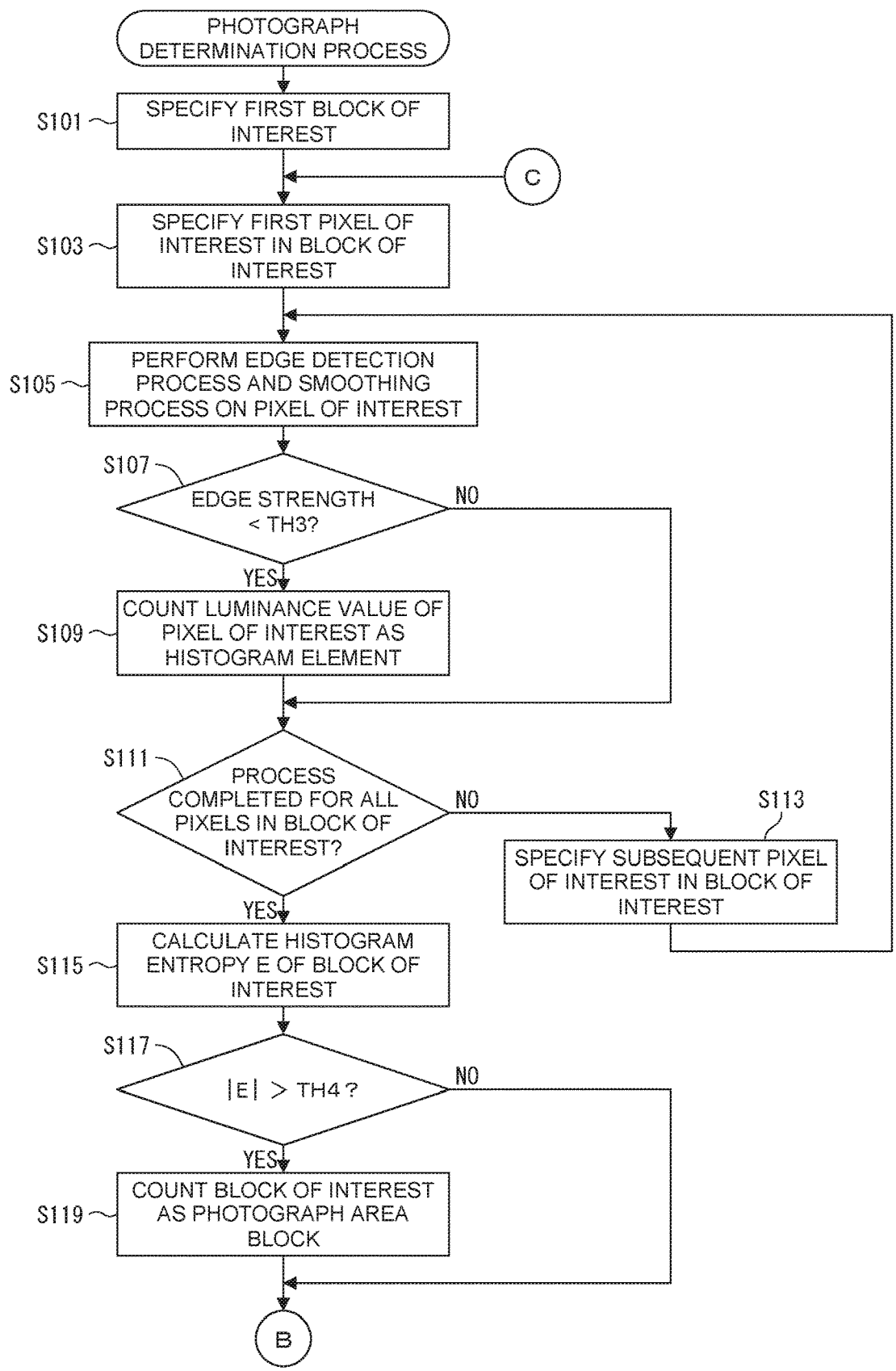
FIG. 10 is a flowchart illustrating part of a flow of a photograph determination process by a photograph determiner according to the first embodiment.
Figure 11:
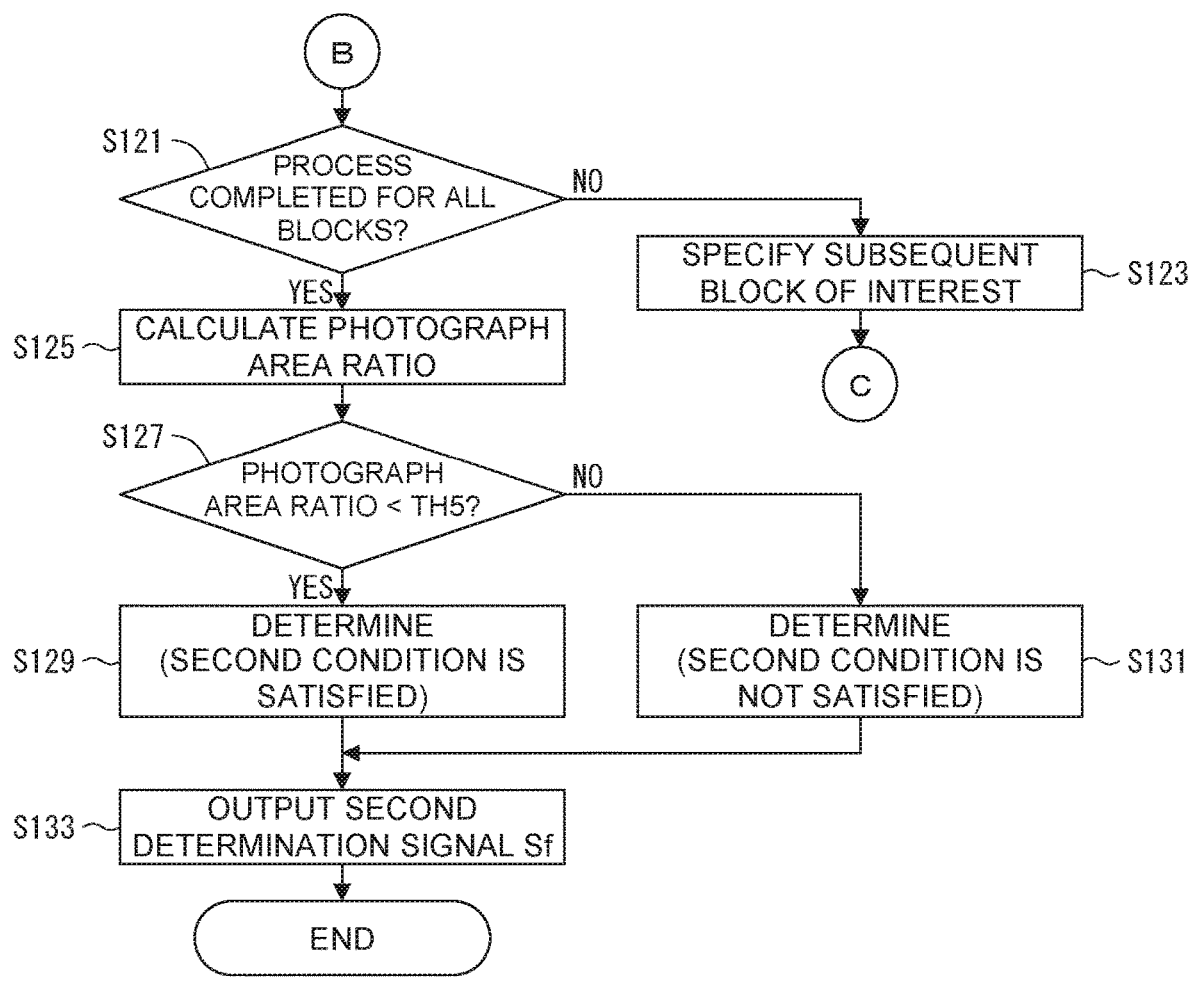
FIG. 11 is a flowchart illustrating the remaining part of the flow of the photograph determination process by the photograph determiner according to the first embodiment.

FIGS. 10 and 11 illustrate the flow of the series of processes, i.e., the photograph determination process, by the photograph determiner 254.

During the photograph determination process, at Step S101, the photograph determiner 254 first focuses on a first (leading) block among the plurality of blocks described above, i.e., specifies a first block of interest. Then, the photograph determiner 254 proceeds to the process at Step S103.

At Step S103, the photograph determiner 254 specifies a first (leading) pixel of interest in the block of interest. Then, the photograph determiner 254 proceeds to the process at Step S105.

At Step S105, the photograph determiner 254 performs an edge detection process and a smoothing process on the pixel of interest, strictly speaking, the small block including the pixel of interest. The small block described herein is a group of pixels including a smaller number of pixels as compared with the above-described block, i.e., a group of pixels including m'×n' pixels (m' is an integer equal to or more than 2 and less than m, and n' is an integer equal to or more than 2 and less than n), e.g., a group of pixels including for example 3×3 pixels (that is, m'=3 and n'=3). Further, m'×n' may be for example 5×5 (that is, m'=5 and n'=5). Then, the photograph determiner 254 proceeds to the process at Step S107.

At Step S107, the photograph determiner 254 compares the edge strength of the small block including the pixel of interest with a predetermined threshold TH3. Here, for example, when the edge strength of the small block including the pixel of interest is smaller than the predetermined threshold TH3 (S107: YES), the photograph determiner 254 determines that the pixel of interest is not a pixel forming a character portion, that is, the pixel of interest is not a pixel based on the character area pixel data, and proceeds to the process at Step S109. Conversely, when the edge strength of the small block including the pixel of interest is equal to or more than the predetermined threshold TH3 (S107: NO), the photograph determiner 254 determines that the pixel of interest is a pixel forming a character portion, that is, the pixel of interest is a pixel based on the character area pixel data, and proceeds to the process at Step S111 described below. The predetermined threshold TH3 is determined as appropriate by experience such as experiment.

At Step S109, the photograph determiner 254 counts the luminance value (L value) of the pixel of interest as an element of the histogram. Then, the photograph determiner 254 proceeds to the process at Step S111.

At Step S111, the photograph determiner 254 determines whether the character detection process including Steps S105 and S107 has been completed for all the pixels in the block of interest. Here, for example, when the character detection process has been completed for all the pixels in the block of interest (S111: YES), the photograph determiner 254 proceeds to the process at Step S115 described below. Conversely, when the character detection process has not been completed for all the pixels in the block of interest (S111: NO), the photograph determiner 254 proceeds to the process at Step S113.

At Step S113, the photograph determiner 254 specifies the subsequent pixel of interest in the block of interest. Then, the photograph determiner 254 returns to the process at Step S105.

Conversely, when the process proceeds from the above-described Step S111 to Step S115, the photograph determiner 254 calculates, at Step S115, the histogram entropy E of the block of interest. As described above, the histogram entropy E is calculated according to Equation 1 described above. The photograph determiner 254 proceeds to the process at Step S117.

At Step S117, the photograph determiner 254 compares the absolute value |E| of the histogram entropy E with the predetermined threshold TH3. Here, for example, when the absolute value |E| of the histogram entropy E is more than the predetermined threshold TH3 (S117: YES), the photograph determiner 254 proceeds to the process at Step S119.

Conversely, when the absolute value |E| of the histogram entropy E is equal to or less than the predetermined threshold TH3 (S117: NO), the photograph determiner 254 proceeds to the process at Step S121 described below.

At Step S119, the photograph determiner 254 counts the block of interest as a photograph area block. Then, the photograph determiner 254 proceeds to the process at Step S121.

At Step S121, the photograph determiner 254 determines whether the process of determining whether it is a photograph area block, i.e., the process from at least Step S105 to Step S117, has been completed for all the blocks. Here, for example, when the process of determining whether it is a photograph area block has been completed for all the blocks (S121: YES), the photograph determiner 254 proceeds to the process at Step S125 described below. Conversely, when the process of determining whether it is a photograph area block has not been completed for all the blocks (S121: NO), the photograph determiner 254 proceeds to the process at Step S123.

At Step S123, the photograph determiner 254 specifies the subsequent block of interest. Then, the photograph determiner 254 returns to the process at Step S103.

Conversely, when the process proceeds from the above-described Step S121 to Step S125, the photograph determiner 254 calculates the photograph area ratio at Step S125. Specifically, the photograph determiner 254 derives, as the photograph area ratio, the ratio of the number of photograph area blocks to the number of all the blocks. Then, the photograph determiner 254 proceeds to the process at Step S127.

At Step S127, the photograph determiner 254 compares the photograph area ratio derived at Step S125 with the predetermined threshold TH5. Here, for example, when the photograph area ratio is less than the predetermined threshold TH5 (S127: YES), the photograph determiner 254 proceeds to the process at Step S129. Conversely, when the photograph area ratio is equal to or more than the predetermined threshold TH5 (S127: NO), the photograph determiner 254 proceeds to the process at Step S131.

At Step S129, the photograph determiner 254 determines that the second condition is satisfied. Then, the photograph determiner 254 proceeds to the process at Step S133.

Conversely, when the process proceeds from the above-described Step S127 to Step S131, the photograph determiner 254 determines, at Step S131, that the second condition is not satisfied. Then, the photograph determiner 254 proceeds to the process at Step S133.

At Step S133, the photograph determiner 254 outputs the second determination signal Sf indicating the determination result at Step S129 or S131. Then, the photograph determiner 254 ends the series of photograph determination processes.

Next, the white base determiner 256 will be described in detail. As described above, the white base determiner 256 derives the white base area ratio, which is the ratio of the white base area pixel data forming the white base area to all sets of pixel data included in the image data Dj' and determines whether the third condition, in which the white base area ratio is more than the third reference value, is satisfied.

Specifically, the white base determiner 256 performs a smoothing process on each set of pixel data included in the image data Dj', strictly speaking, a white-base determination block that is a group of m"×n" (m" and n" are both integers equal to or more than 2) sets of pixel data including the corresponding pixel data. Furthermore, m"×n" are, for example, 3×3 (that is, m"=3 and n"=3) or 5×5 (that is, m"=5 and n"=5).

Then, the white base determiner 256 determines whether the pixel value of the pixel data (the pixel of interest) having undergone the smoothing process belongs to the above-described achromatic space 310. This determination is made in the same manner as by the color distribution determiner 252 based on whether the absolute value |C1| of the C1 value and the absolute value |C2| of the C2 value of the pixel data are both equal to or less than the radius TH1 of the achromatic space 310. Further, with regard to the pixel data for which it is determined that the pixel value belongs to the achromatic space 310, the white base determiner 256 compares the luminance value (L value) with a predetermined threshold TH6. Here, for example, when the luminance value of the pixel data is equal to or more than the predetermined threshold TH6, the white base determiner 256 determines that the pixel data is white base area pixel data. Conversely, when the luminance value of the pixel data is less than the predetermined threshold TH6, the white base determiner 256 determines that the pixel data is not white base area pixel data. The predetermined threshold TH6 is determined as appropriate by experience such as experiment and is for example a value of 95% of the maximum value (=100) of the luminance value, i.e., 95.

In this manner, with regard to all sets of pixel data included in the image data Dj', the white base determiner 256 determines whether it is white base area pixel data. Then, the white base determiner 256 derives, as the white base area ratio, the ratio of the number of sets of white base area pixel data to the number of all sets of pixel data included in the image data Dj'.

Further, the white base determiner 256 compares the white base area ratio with a predetermined threshold TH7, which is different from the above-described threshold. Here, for example, it is assumed that the white base area ratio is more than the predetermined threshold TH7. In this case, the white base determiner 256 recognizes that the ratio of the white base area in the image data Dj' is relatively large, in other words, the area where the pixel values may be regarded as being uniform is relatively large. Then, the white base determiner 256 determines that, when the index color process is performed on the image data Dj' (strictly speaking, the input image data Di), a high compression rate may be obtained. Thus, the white base determiner 256 determines that the third condition is satisfied.

Conversely, it is assumed that the white base area ratio is equal to or less than the predetermined threshold TH7. In this case, the white base determiner 256 recognizes that the ratio of the white base area in the image data Dj' is relatively small, in other words, the area where the pixel values may be regarded as being uniform is relatively small. Then, the white base determiner 256 determines that, when the index color process is performed on the image data Dj' (strictly speaking, the input image data Di), it is difficult to obtain a high compression rate. Thus, the white base determiner 256 determines that the third condition is not satisfied.

Specifically, the white base determiner 256 handles the predetermined threshold TH7 described herein as the third reference value. Then, the white base determiner 256 determines whether the third condition is satisfied based on whether the white base area ratio is more than the predetermined threshold TH7. The predetermined threshold TH7 is also determined as appropriate by experience such as experiment and is for example 60%.

As described above, the white base determiner 256 outputs the third determination signal Sg indicating the determination result obtained by itself. Then, the third determination signal Sg is input to the final determiner 258.

Figure 12:
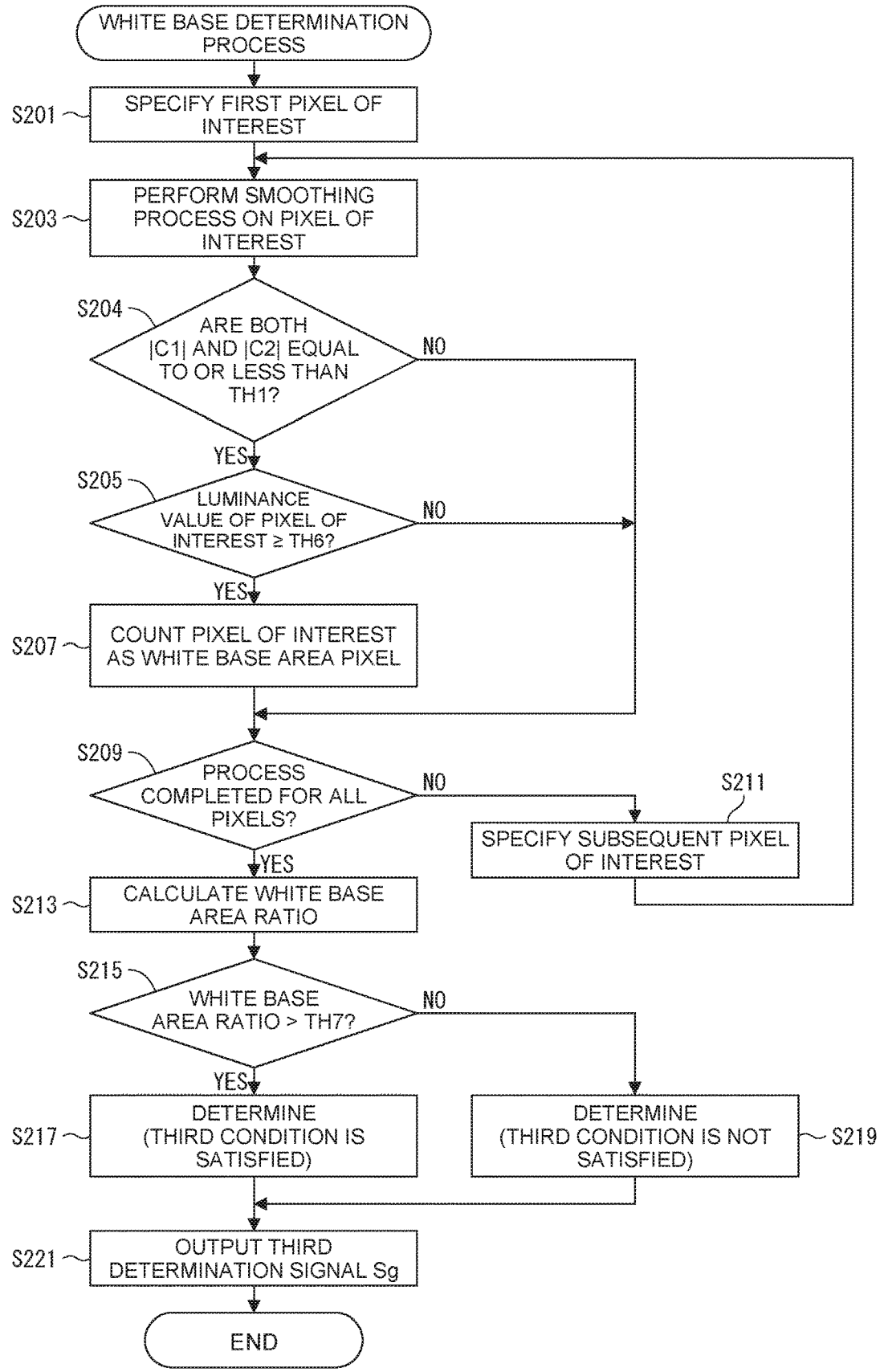
FIG. 12 is a flowchart illustrating a flow of a white base determination process by a white base determiner according to the first embodiment.

FIG. 12 illustrates the flow of the series of processes, i.e., the white base determination process, by the white base determiner 256.

During the white base determination process, at Step S201, the white base determiner 256 first focuses on first (leading) pixel data included in the image data Dj', i.e., specifies the first pixel of interest of the image based on the image data Dj'. Then, the white base determiner 256 proceeds to the process at Step S203.

At Step S203, the white base determiner 256 performs a smoothing process on the pixel of interest, strictly speaking, the above-described white base determination block including the pixel of interest. Then, the white base determiner 256 proceeds to the process at Step S204.

At Step S204, the white base determiner 256 determines whether the absolute value |C1| of the C1 value and the absolute value |C2| of the C2 value of the pixel of interest (pixel data) are both equal to or less than the radius TH1 of the achromatic space 310, i.e., determines whether the pixel value of the pixel of interest belongs to the achromatic space 310. Here, for example, when the absolute value |C1| of the C1 value and the absolute value |C2| of the C2 value of the pixel of interest are both equal to or less than the radius TH1 of the achromatic space 310 (S204: YES), the white base determiner 256 proceeds to the process at Step S205. Conversely, when any of the absolute value |C1| of the C1 value and the absolute value |C2| of the C2 value of the pixel of interest is more than the radius TH1 of the achromatic space 310 (S204: NO), the white base determiner 256 proceeds to the process at Step S209 described below.

At Step S205, the white base determiner 256 compares the luminance value (L value) of the pixel of interest with a predetermined threshold TH6. Here, for example, when the luminance value of the pixel of interest is equal to or more than the predetermined threshold TH6 (S205: YES), the white base determiner 256 proceeds to the process at Step S207. Conversely, when the luminance value of the pixel of interest is less than the predetermined threshold TH6 (S205: NO), the white base determiner 256 proceeds to the process at Step S209 described below.

At Step S207, the white base determiner 256 counts the pixel of interest as a white base area pixel that is a component of the white base area, i.e., counts the pixel data corresponding to the pixel of interest as white base area pixel data. Then, the white base determiner 256 proceeds to the process at Step S209.

At Step S209, the white base determiner 256 determines whether the process of determining whether it is a white base area pixel, i.e., the process from at least Step S203 to Step S205, has been completed for all the pixels. Here, for example, when the process of determining whether it is a white base area pixel has been completed for all the pixels (S209: YES), the white base determiner 256 proceeds to the process at Step S213 described below. Conversely, when the process of determining whether it is a white base area pixel has not been completed for all the pixels (S209: NO), the white base determiner 256 proceeds to the process at Step S211.

At Step S211, the white base determiner 256 specifies the subsequent pixel of interest included in the image data Dj'. Then, the white base determiner 256 returns to the process at Step S203.

Conversely, when the process proceeds from the above-described Step S209 to Step S213, the white base determiner 256 calculates the white base area ratio at Step S213. Specifically, the white base determiner 256 derives, as the white base area ratio, the ratio of the number of sets of white base area pixel data to the number of all sets of pixel data included in the image data Dj'. Then, the white base determiner 256 proceeds to the process at Step S215.

At Step S215, the white base determiner 256 compares the white base area ratio derived at Step S213 with the predetermined threshold TH7. Here, for example, when the white base area ratio is more than the predetermined threshold TH7 (S215: YES), the white base determiner 256 proceeds to the process at Step S217. Conversely, when the white base area ratio is equal to or less than the predetermined threshold TH7 (S215: NO), the white base determiner 256 proceeds to the process at Step S219.

At Step S217, the white base determiner 256 determines that the third condition is satisfied. Then, the white base determiner 256 proceeds to the process at Step S221.

Conversely, when the process proceeds from the above-described Step S215 to Step S219, the white base determiner 256 determines, at Step S219, that the third condition is not satisfied. Then, the white base determiner 256 proceeds to the process at Step S221.

At Step S221, the white base determiner 256 outputs the third determination signal Sg indicating the determination result at Step S217 or S219. Then, the white base determiner 256 ends the series of white base determination processes.

Next, the final determiner 258 will be described in detail. As described above, the final determiner 258 finally determines whether it is appropriate to perform either the index color process or the full-color process based on the first determination signal Se, the second determination signal Sf, and the third determination signal Sg, that is, based on whether the first condition, the second condition, and the third conditions are each satisfied. Then, the final determiner 258 outputs the color number conversion determination signal Sc indicating the determination result by using the final determination result obtained by itself as the determination result of the entire color number conversion determiner 200.

Figure 13:
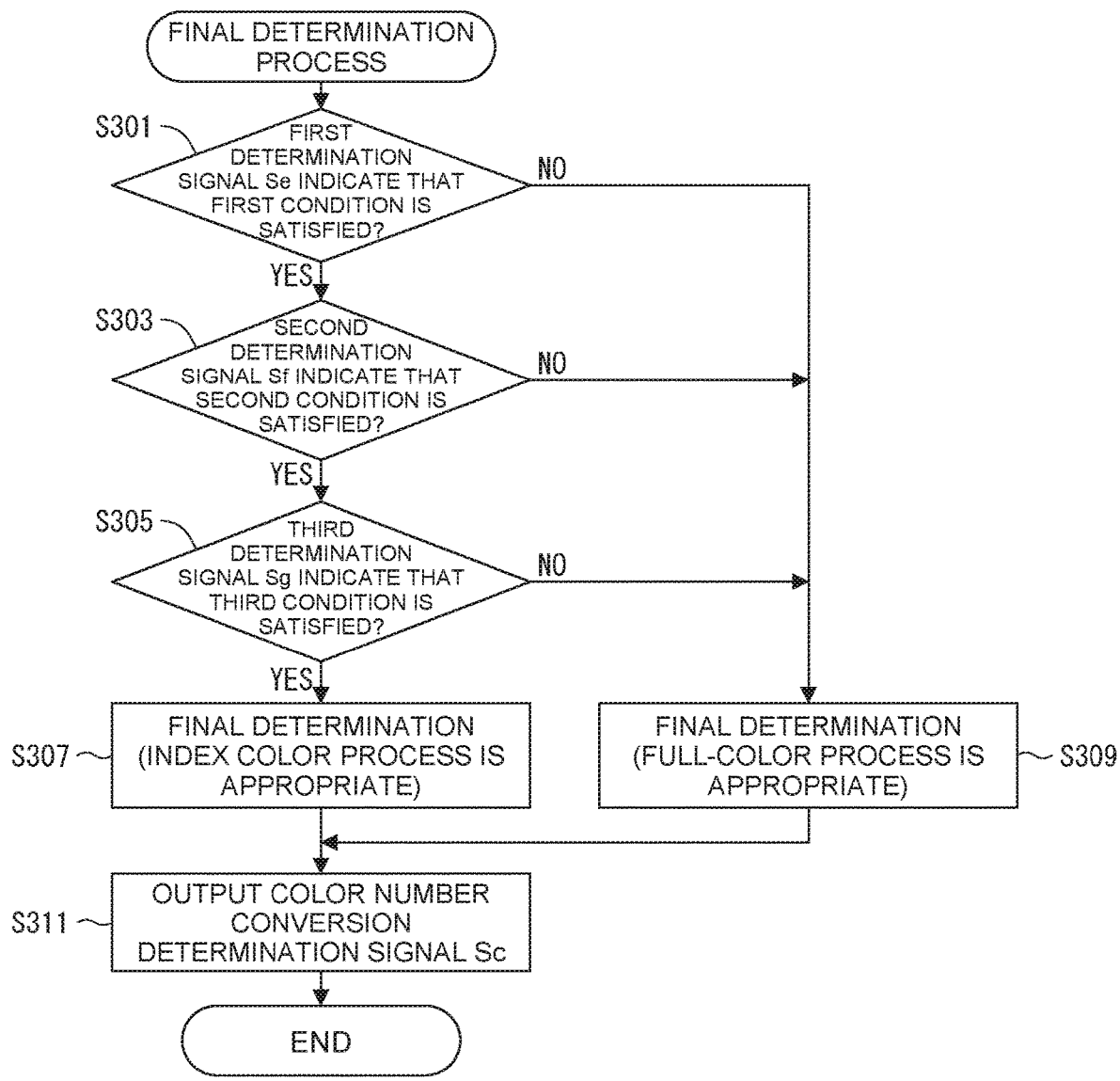
FIG. 13 is a flowchart illustrating a flow of a final determination process by a final determiner according to the first embodiment.

FIG. 13 illustrates the flow of the series of processes, i.e., the final determination process, by the final determiner 258.

During the final determination process, at Step S301, the final determiner 258 first determines whether the first determination signal Se, i.e., the determination result by the color distribution determiner 252, indicates that the first condition is satisfied. Here, for example, when the first condition is satisfied (S301: YES), the final determiner 258 proceeds to the process at Step S303. Conversely, when the first condition is not satisfied (S301: NO), the final determiner 258 proceeds to the process at Step S309 described below.

At Step S303, the final determiner 258 determines whether the second determination signal Sf, i.e., the determination result by the photograph determiner 254, indicates that the second condition is satisfied. Here, for example, when the second condition is satisfied (S303: YES), the final determiner 258 proceeds to the process at Step S305. Conversely, when the second condition is not satisfied (S303: NO), the final determiner 258 proceeds to the process at Step S309 described below.

At Step S305, the final determiner 258 determines whether the third determination signal Sg, i.e., the determination result by the white base determiner 256, indicates that the third condition is satisfied. Here, for example, when the third condition is satisfied (S305: YES), the final determiner 258 proceeds to the process at Step S307. Conversely, when the third condition is not satisfied (S305: NO), the final determiner 258 proceeds to the process at Step S309 described below.

That is, the final determiner 258 proceeds to the process at Step S307 only when the first condition, the second condition, and the third condition are all satisfied. Otherwise, that is, when at least one of the first condition, the second condition, and the third condition is not satisfied, the final determiner 258 proceeds to the process at Step S309.

At Step S307, the final determiner 258 makes a final determination that it is appropriate to perform the index color process. Then, the final determiner 258 proceeds to the process at Step S311.

Conversely, at Step S309, the final determiner 258 makes a final determination that it is appropriate to perform the full-color process. Then, the final determiner 258 proceeds to the process at Step S311.

At Step S311, the final determiner 258 outputs the color number conversion determination signal Sc indicating the final determination result at Step S307 or S309, that is, indicating the determination result of the entire color number conversion determiner 200. Then, the final determiner 258 ends the series of final determination processes.

The image processor 14 including the above-described color number conversion determiner 200 includes, for example, an ASIC. This is not a limitation, and the image processor 14 may include an element dedicated to image processing, such as a DSP, in addition to the ASIC. In particular, in order to increase the speed of the process by the color number conversion determiner 200, the resolution of the input image data Dj to the color number conversion determiner 200 may be reduced as appropriate, and thus the process by the color number conversion determiner 200 may be performed in a simplified manner, so to speak.

As described above, according to the first embodiment, in particular, with the automatic discrimination function performed by the color number conversion determiner 200, it is determined whether it is appropriate to perform either the index color process or the full-color process based on the color distribution degree, which is a distribution degree of the pixel values of the respective sets of pixel data included in the input image data Di (strictly speaking, the image data Dj'), the photograph area ratio, which is the ratio of the photograph area pixel data forming the photograph area to the pixel data, and the white base area ratio, which is the ratio of the white base area pixel data forming the white base area to the pixel data. This enables an appropriate determination.

The color distribution determiner 252, which derives the color distribution degree, performs the color reduction process for determination as described above, and in this case, divides the LC1C2 color space 300, which is the coordinate space of the image data Dj', into the one achromatic space 310 and the eight chromatic spaces 320, 320, . . . , but the present invention is not limited thereto. For example, in the same manner as the typical color reduction process using the median cut algorithm, the color distribution determiner 252 may perform the color reduction process using the median cut algorithm without dividing the LC1C2 color space 300. However, as described above, the color reduction process using the median cut algorithm is performed after the LC1C2 color space 300 is divided into the one achromatic space 310 and the eight chromatic spaces 320, 320, . . . so that an appropriate index color (representative color) may be obtained and thus an appropriate color distribution degree may be derived.

Here, the chromatic space 330 is equally divided by eight to specify the eight chromatic spaces 320, 320, . . . , but the present invention is not limited thereto. Specifically, the chromatic space 330 may be unequally divided instead of being equally divided, and therefore the division number, the division position, the division interval, and the like, of the chromatic space 330 may be set optionally, and furthermore the chromatic space 330 may be prevented from being divided (segmentalized).

With regard to the color reduction process for compression by the color number conversion processor 216, too, the color reduction process for compression may be performed after the division into one achromatic space and one or more chromatic spaces in the same manner as the color reduction process for determination by the color distribution determiner 252. Accordingly, in the color reduction process for compression by the color number conversion processor 216, an appropriate index color may be obtained and thus the deterioration of the image quality may be prevented.

The color distribution determiner 252 according to the first embodiment, in particular, the color distribution determiner 252 that performs Steps S1 to S21 of the color distribution determination process (see FIGS. 8 and 9), is an example of a color distribution degree deriver according to the present invention. In particular, the color distribution determiner 252, which performs Steps S1 to S19 of the color distribution determination process, is an example of a determination color reducer according to the present invention. The color distribution determiner 252 that performs Step S21 of the color distribution determination process, strictly speaking, the color distribution determiner 252 that derives the above-described mutual difference (=the maximum value−the minimum value) at Step S21, i.e., derives the length of the longest side of the subspace 350, which has the longest side, is an example of a color distribution degree derivation executor according to the present invention.

The photograph determiner 254 according to the first embodiment, in particular, the photograph determiner 254 that performs Steps S101 to S125 of the photograph determination process (see FIGS. 10 and 11), is an example of a photograph area ratio deriver according to the present invention. In particular, the photograph determiner 254 that performs Steps S101 to S115 of the photograph determination process is an example of an entropy deriver according to the present invention. The photograph determiner 254 that performs Steps S117 to S119 of the photograph determination process is an example of a photograph area block determiner according to the present invention. The photograph determiner 254 that performs Step S125 of the photograph determination process is an example of a photograph area ratio deriver according to the present invention.

Furthermore, the white base determiner 256 according to the first embodiment, in particular, the white base determiner 256 that performs Steps S201 to S213 of the white base determination process (see FIG. 12), is an example of a color uniformity area ratio deriver according to the present invention. In particular, the white base determiner 256 that performs Steps S201 to S211 of the white base determination process is an example of a specifier according to the present invention. The white base determiner 256 that performs Step S213 of the white base determination process is an example of a color uniformity area ratio derivation executor according to the present invention.

The final determiner 258 according to the first embodiment is an example of a determiner according to the present invention. Strictly speaking, the color distribution determiner 252 that performs Steps S23 to S29 of the color distribution determination process, the photograph determiner 254 that performs Steps S127 to S133 of the photograph determination process, and the white base determiner 256 that performs Steps S215 to S221 of the white base determination process also forms an example of the determiner according to the present invention.

Second Embodiment

Next, a second embodiment of the present invention will be described.

Figure 14:
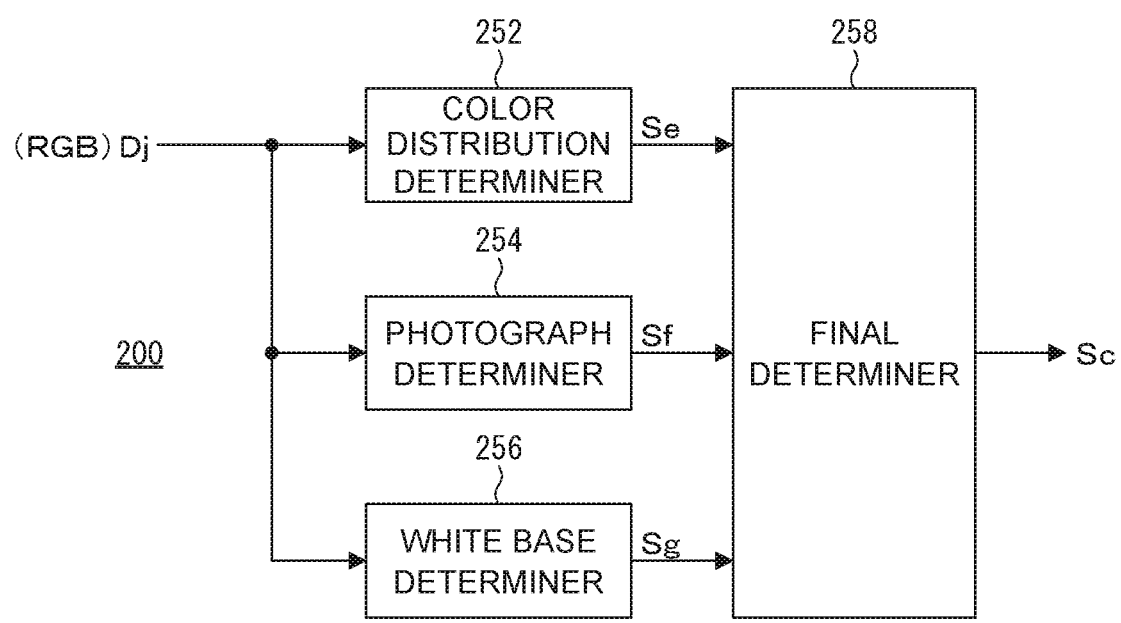
FIG. 14 is a block diagram illustrating a detailed configuration of a color number conversion determiner according to a second embodiment of the present invention.

According to the second embodiment, the color number conversion determiner 200 is configured as illustrated in FIG. 14. Specifically, according to the second embodiment, the color converter 250 as in the first embodiment is not included. According to the second embodiment, as the input image data Dj to the color number conversion determiner 200, the RGB image data is directly input to the color distribution determiner 252, the photograph determiner 254, and the white base determiner 256. The other parts according to the second embodiment are identical to those in the first embodiment. Therefore, the parts in the second embodiment identical to those in the first embodiment are denoted by the same reference numerals as those in the first embodiment, and detailed descriptions are omitted.

Figure 15:
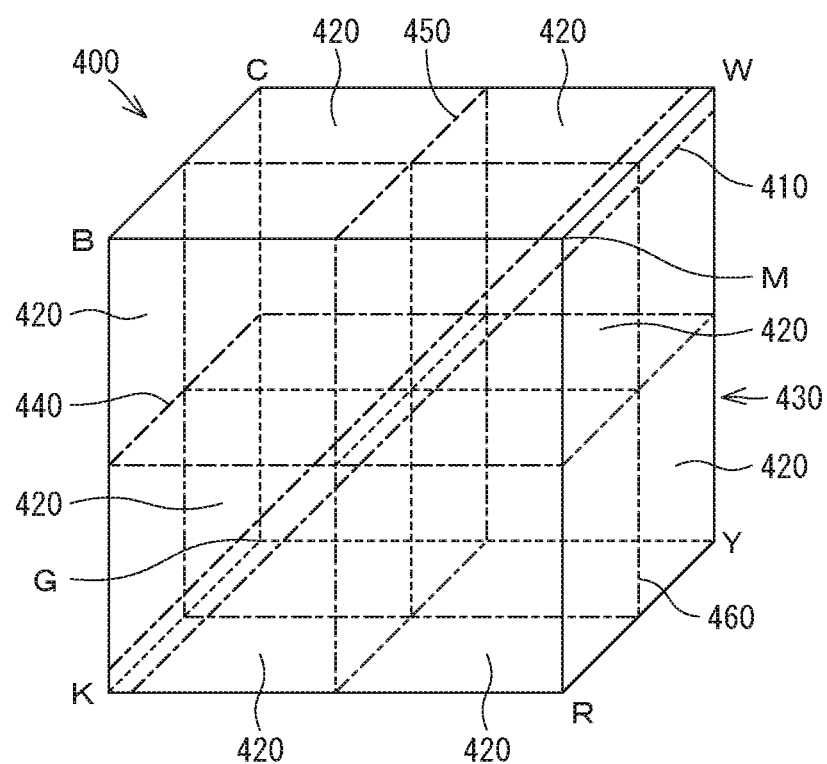
FIG. 15 is a diagram illustrating the manner of the color distribution determination process by the color distribution determiner according to the second embodiment.

According to the second embodiment, too, for example, the color distribution determiner 252 performs the color reduction process for determination, as in the first embodiment. In this case, as illustrated in FIG. 15, the color distribution determiner 252 divides an RGB color space 400, which is the coordinate space of the image data Dj input to the color distribution determiner 252, into one achromatic space 410 and a plurality of, for example, eight, chromatic spaces 420, 420, . . . . FIG. 15 illustrates the RGB color space 400 in three-dimensional Cartesian coordinates. In the RGB color space 400, the origin corresponds to black (K: key plate). The vertex opposite to the origin corresponds to white (W). The opposite vertex of the origin (K) on the R–G plane corresponds to yellow (Y). The opposite vertex of the origin (K) on the G–B plane corresponds to cyan (C). The opposite vertex of the origin (K) on the B–R plane corresponds to magenta (M). The respective component values of R, G, and B are 8 bits as described above, i.e., "0" to "255".

For the RGB color space 400, the color distribution determiner 252 defines, as the achromatic space 410, the portion where the relative difference |R–G| between the R value and the G value, the relative difference |G–B| between the G value and the B value, and the relative difference |B–R| between the B value and the R value are all equal to or less than a predetermined threshold TH8. Specifically, the color distribution determiner 252 defines, as the achromatic space 410, the straight line connecting the vertex corresponding to black and the vertex corresponding to white and the portion around the straight line. The predetermined threshold TH8 described herein is a value sufficiently smaller than the maximum value (=255) of the respective component values of R, G, and B, for example "6", but is not limited thereto.

Also, the color distribution determiner 252 defines, as a chromatic space, a portion 430 other than the achromatic space 410 in the RGB color space 400. The color distribution determiner 252 equally divides the chromatic space 430 by three planes 440, 450, and 460 to define the eight segmentalized cubic chromatic spaces 420, 420, . . . . The plane 440 is provided to be parallel to the R–G plane and include the median of the B value. The plane 450 is provided to be parallel to the G–B plane and include the median of the R value. The plane 460 is provided to be parallel to the B–R plane and include the median of the G value.

Then, the color distribution determiner 252 assigns the pixel values of the respective sets of pixel data included in the image data Dj to the RGB color space 400. Although not illustrated, in the achromatic space 410 and each of the chromatic spaces 420, 420, . . . , the color distribution determiner 252 virtualizes a cuboidal subspace having the minimum volume within the range including the pixel values of all sets of pixel data assigned thereto, i.e., virtualizes subspaces in whole.

Subsequently, the color distribution determiner 252 performs the color reduction process in the same manner as in the first embodiment. Specifically, the color distribution determiner 252 calculates the maximum value and the minimum value of the respective component values of R, G, and B for each of the subspaces. Then, the color distribution determiner 252 specifies the subspace having the maximum mutual difference (=the maximum value–the minimum value) between the maximum value and the minimum value of the component values regardless of any of the component values of R, G, and B. In other words, the color distribution determiner 252 specifies the subspace having the longest side. The color distribution determiner 252 cuts the specified subspace by half, specifically, cuts it such that the mutual difference between the component values is reduced by half, for which the mutual difference between the maximum value and the minimum value of the respective component values of R, G, and B is the maximum. In other words, the color distribution determiner 252 cuts the subspace having the longest side such that the length of the longest side of the subspace is reduced by half.

In this manner, the color distribution determiner 252 cuts the subspace having the longest side each time until the total number of subspaces reaches the above-described predetermined number N (e.g., N=20). When the total number of subspaces reaches the predetermined number N, the color distribution determiner 252 specifies the subspace having the longest side among the N subspaces. The color distribution determiner 252 compares the length of the longest side of the specified subspace with a predetermined threshold TH9.

Here, for example, it is assumed that the length of the longest side of the specified subspace is shorter than the predetermined threshold TH9. In this case, the color distribution determiner 252 determines that, even when the color reduction process for compression is performed by the above-described color number conversion processor 216 (FIG. 3) or even when the index color process including the color reduction process is performed, the image quality (color shade) does not deteriorate much, in other words, the deterioration of the image quality falls within an acceptable range. Thus, the color distribution determiner 252 determines that the first condition is satisfied.

Conversely, it is assumed that the length of the longest side of the specified subspace is equal to or more than the predetermined threshold TH9. In this case, the color distribution determiner 252 determines that the image quality may largely deteriorate when the color number conversion processor 216 performs the color reduction process for compression. In other words, the color distribution determiner 252 determines that it is not appropriate to perform the color reduction process for compression by the color number conversion processor 216 and thus it is not appropriate to perform the index color process including the color reduction process. Thus, the color distribution determiner 252 determines that the first condition is not satisfied.

That is, the color distribution determiner 252 estimates the color distribution degree of the image data Dj', i.e., indirectly derives the color distribution degree, based on the length of the longest side of the subspace having the longest side. Also, the color distribution determiner 252 handles the predetermined threshold TH9 described herein as the first reference value. The color distribution determiner 252 determines whether the first condition is satisfied based on whether the length of the longest side of the subspace having the longest side is shorter than the predetermined threshold TH9. The predetermined threshold TH9 is determined as appropriate by experience such as experiment.

The color distribution determiner 252 outputs the first determination signal Se indicating the determination result obtained by itself. The first determination signal Se is input to the final determiner 258.

Figure 16:
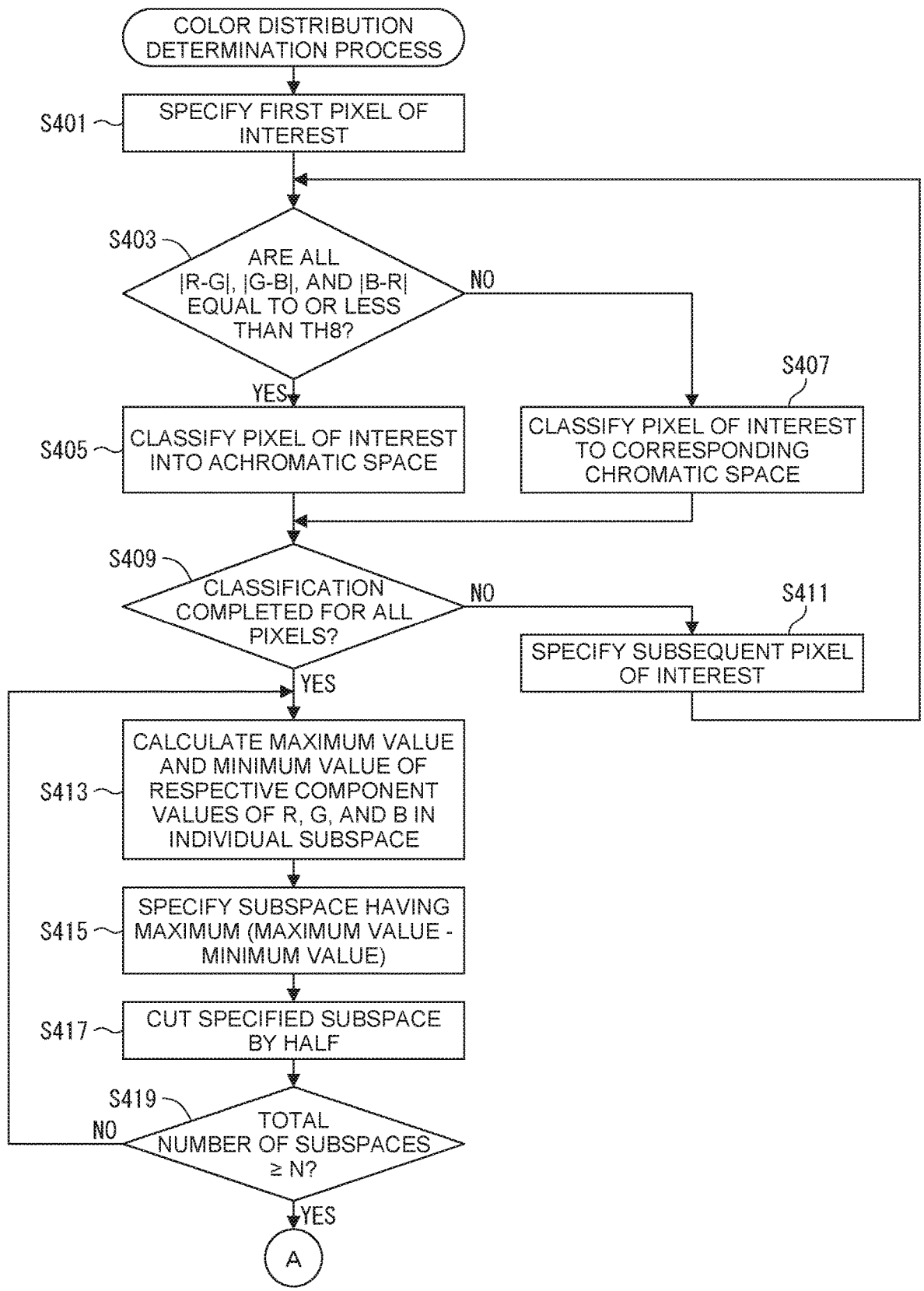
FIG. 16 is a flowchart illustrating part of a flow of the color distribution determination process by the color distribution determiner according to the second embodiment.
Figure 17:
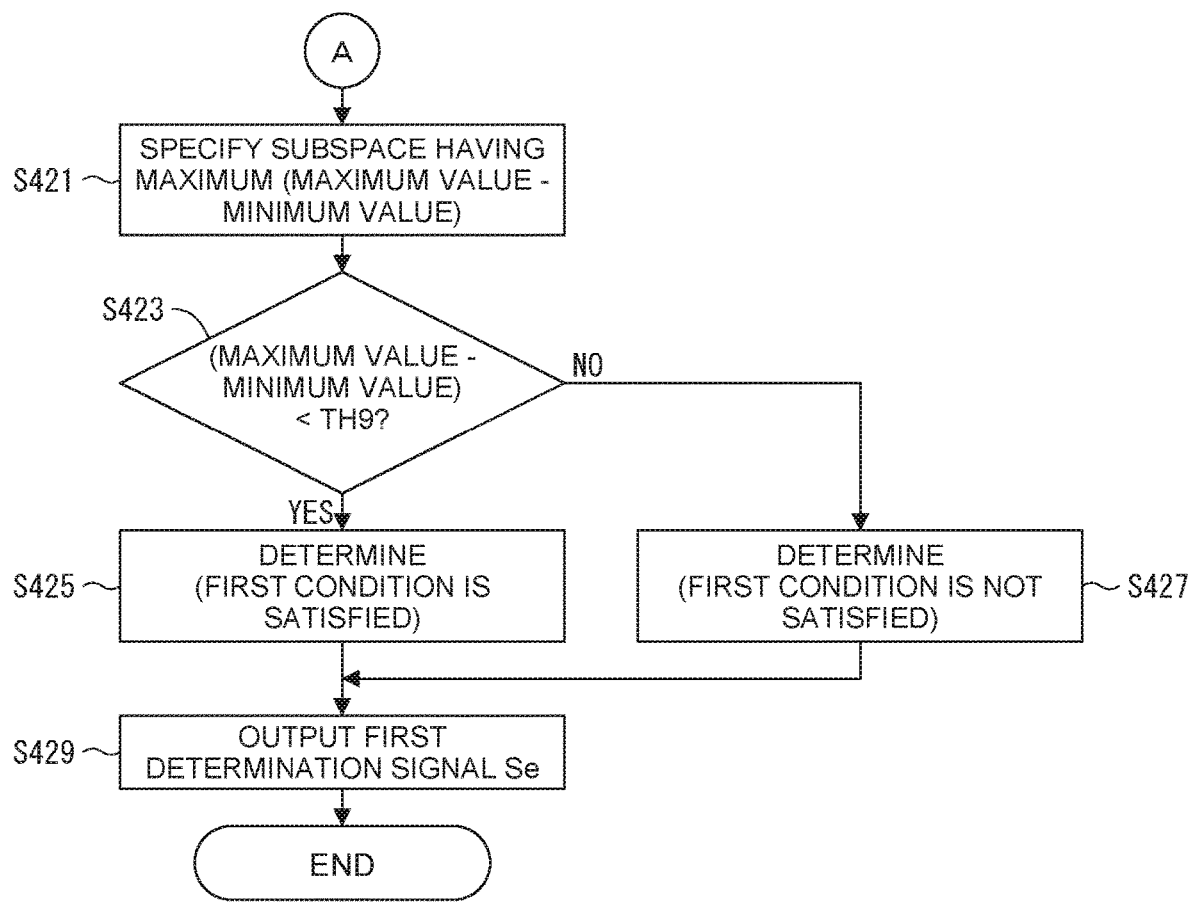
FIG. 17 is a flowchart illustrating the remaining part of the flow of the color distribution determination process by the color distribution determiner according to the second embodiment.

FIGS. 16 and 17 illustrate the flow of the series of processes, i.e., the color distribution determination process, by the color distribution determiner 252 according to the second embodiment.

During the color distribution determination process, at Step S401, the color distribution determiner 252 first focuses on first (leading) pixel data included in the image data Dj, i.e., specifies the first pixel of interest of the image based on the image data Dj. Then, the color distribution determiner 252 proceeds to the process at Step S403.

At Step S403, the color distribution determiner 252 determines whether the relative difference |R-G| between the R value and the G value, the relative difference |G-B| between the G value and the B value, and the relative difference |B-R| between the B value and the R value of the pixel of interest (pixel data) are all equal to or less than the predetermined threshold TH8. Here, for example, when the relative differences |R-G|, |G-B|, and |B-R| of the pixel of interest are all equal to or less than the predetermined threshold TH8 (S403: YES), the color distribution determiner 252 proceeds to the process at Step S405. Conversely, when any of the relative differences |R-G|, |G-B|, and |B-R| of the pixel of interest is more than the predetermined threshold TH8 (S403: NO), the color distribution determiner 252 proceeds to the process at Step S407 described below.

At Step S405, the color distribution determiner 252 classifies the pixel of interest into the achromatic space 410, strictly speaking, assigns the pixel of interest to a coordinate position in the achromatic space 410. Then, the color distribution determiner 252 proceeds to the process at Step S409.

Conversely, when the process proceeds from the above-described Step S403 to Step S407, the color distribution determiner 252 classifies, at Step S407, the pixel of interest to the corresponding space among the eight chromatic spaces 420, 420, . . . , strictly speaking, assigns the pixel of interest to a coordinate position in the corresponding chromatic space 420. Then, the color distribution determiner 252 proceeds to the process at Step S409.

At Step S409, the color distribution determiner 252 determines whether the classification of all the pixels included in the image data Dj into any of the achromatic space 410 and the chromatic spaces 420, 420, . . . has been completed. Here, for example, when the classification for all the pixels has been completed (S409: YES), the color distribution determiner 252 proceeds to the process at Step S413 described below. Conversely, when the classification for all the pixels has not been completed (S409: NO), the color distribution determiner 252 proceeds to the process at Step S411.

At Step S411, the color distribution determiner 252 specifies the subsequent pixel of interest included in the image data Dj. Then, the color distribution determiner 252 returns to the process at Step S403.

Conversely, when the process proceeds from the above-described Step S409 to Step S413, the color distribution determiner 252 calculates, at Step S413, the maximum value and the minimum value of the respective component values of R, G, and B in the individual subspace. Then, the color distribution determiner 252 proceeds to the process at Step S415.

At Step S415, the color distribution determiner 252 specifies the subspace having the maximum mutual difference (=the maximum value–the minimum value) between the maximum value and the minimum value of the component values regardless of any of the component values of R, G, and B. In other words, the color distribution determiner 252 specifies the subspace having the longest side. Then, the color distribution determiner 252 proceeds to the process at Step S417.

At Step S417, the color distribution determiner 252 cuts the subspace specified at Step S415 by half, specifically, cuts it such that the mutual difference between the component values is reduced by half, for which the mutual difference between the maximum value and the minimum value of the respective component values of R, G, and B is the maximum. In other words, the color distribution determiner 252 cuts the subspace having the longest side such that the length of the longest side of the subspace is reduced by half. Then, the color distribution determiner 252 proceeds to the process at Step S419.

At Step S419, the color distribution determiner 252 determines whether the total number of subspaces has reached the above-described predetermined number N. Here, for example, when the total number of subspaces has not reached the predetermined number N (S419: NO), the color distribution determiner 252 returns to the process at Step S413. Conversely, when the total number of subspaces has reached the above-described predetermined number N (S419: YES), the color distribution determiner 252 proceeds to the process at Step S421.

At Step S421, in the same manner as at Step S415 described above, the color distribution determiner 252 specifies the subspace having the maximum mutual difference (=the maximum value–the minimum value) between the maximum value and the minimum value of the component values, i.e., specifies the subspace having the longest side regardless of any of the component values of R, G, and B. Then, the color distribution determiner 252 proceeds to the process at Step S423.

At Step S423, the color distribution determiner 252 determines whether the above-described mutual difference (=the maximum value–the minimum value) in the subspace specified at Step S421 is smaller than the predetermined threshold TH9, i.e., determines whether the length of the longest side of the subspace is shorter than the predetermined threshold TH9. Here, for example, when the mutual difference (=the maximum value–the minimum value) is smaller than the predetermined threshold TH4, i.e., when the length of the longest side of the subspace, which has the longest side, is shorter than the predetermined threshold TH4 (S423: YES), the color distribution determiner 252 proceeds to the process at Step S425. Conversely, when the mutual difference (=the maximum value–the minimum value) is equal to or more than the predetermined threshold TH9, i.e., when the length of the longest side of the subspace, which has the longest side, is equal to or more than the predetermined threshold TH9 (S423: NO), the color distribution determiner 252 proceeds to the process at Step S427 described below.

At Step S425, the color distribution determiner 252 determines that the first condition is satisfied. Then, the color distribution determiner 252 proceeds to the process at Step S429.

Conversely, when the process proceeds from the above-described Step S423 to Step S427, the color distribution determiner 252 determines, at Step S427, that the first condition is not satisfied. Then, the color distribution determiner 252 proceeds to the process at Step S429.

At Step S429, the color distribution determiner 252 outputs the first determination signal Se indicating the determination result at Step S425 or S427. Then, the color distribution determiner 252 ends the series of color distribution determination processes.

The photograph determiner 254 performs the photograph determination process in the same manner as in the first embodiment (see FIGS. 10 and 11). According to the second embodiment, the photograph determination process may be performed after the luminance value (L value) is obtained from the respective component values of R, G, and B or, for example, the G value may be applied instead of the luminance value.

The white base determiner 256 also performs the white base determination process in the same manner as in the first embodiment (see FIG. 12). According to the second embodiment, it is determined whether the pixel value of the pixel data belongs to the achromatic space 410 based on whether the relative differences |R−G|, |G−B|, and |B−R| of the pixel data (pixel of interest) having undergone the smoothing process are all equal to or less than the above-described threshold TH8. Then, with regard to the pixel data for which it is determined that the pixel value belongs to the achromatic space 410, the luminance value and the predetermined threshold TH1 are compared to each other, and thus it is determined whether it is white base area pixel data. In this case, the luminance value may be obtained from the respective component values of R, G, and B of the pixel values of the image data or, for example, the G value may be applied instead of the luminance value.

Thus, according to the second embodiment, in particular, the color distribution determiner 252 performs the color reduction process for determination in the RGB color space 400 and, furthermore, performs the color distribution determination process including the color reduction process for determination. According to the second embodiment, as in the first embodiment, it is possible to properly determine whether it is appropriate to perform either the index color process or the full-color process.

In particular, according to the second embodiment, the color converter 250 as in the first embodiment is not included, that is, the color conversion process is not performed to convert the RGB image data, which serves as the input image data Dj, into the LC1C2 format image data Dj', and therefore the process of the color number conversion determiner 200 as a whole may be simplified. In short, the second embodiment is more advantageous than the first embodiment in terms of processing performance. In terms of determination accuracy, the first embodiment is more advantageous than the second embodiment.

According to the second embodiment, the color distribution determiner 252, which derives the color distribution degree, performs the color reduction process for determination as described above, and in this case, divides the RGB color space 400, which is the coordinate space of the image data Dj, into the one achromatic space 410 and the eight chromatic spaces 420, 420, ..., but the present invention is not limited thereto. For example, in the same manner as the typical color reduction process using the median cut algorithm, the color distribution determiner 252 may perform the color reduction process using the median cut algorithm without dividing the RGB color space 400. However, as described above, the color reduction process using the median cut algorithm is performed after the RGB color space 400 is divided into the one achromatic space 410 and the eight chromatic spaces 420, 420, ... so that an appropriate index color (representative color) may be obtained and thus an appropriate color distribution degree may be derived.

The chromatic space 430 is equally divided by eight to specify the eight chromatic spaces 420, 420, ..., but the present invention is not limited thereto. Specifically, the color space 430 may be unequally divided instead of being equally divided, and therefore the division number, the division position, and the like, of the chromatic space 430 may be set optionally, and furthermore the chromatic space 430 may be prevented from being divided (segmentalized).

According to the second embodiment, too, with regard to the color reduction process for compression by the color number conversion processor 216, the color reduction process for compression may be performed after the division into one achromatic space and one or more chromatic spaces in the same manner as the color reduction process for determination by the color distribution determiner 252. Thus, for the color reduction process for compression by the color number conversion processor 216, too, it is possible to obtain a more appropriate index color and therefore further prevent the deterioration of the image quality.

The color distribution determiner 252 according to the second embodiment, in particular, the color distribution determiner 252 that performs Steps S401 to S421 of the color distribution determination process (see FIGS. 16 and 17) is also an example of the color distribution degree deriver according to the present invention. In particular, the color distribution determiner 252 that performs Steps S401 to S419 of the color distribution determination process is an example of the determination color reducer according to the present invention. The color distribution determiner 252 that performs Step S421 of the color distribution determination process, strictly speaking, the color distribution determiner 252 that derives the above-described mutual difference (=the maximum value−the minimum value) at Step S421, i.e., derives the length of the longest side of the subspace, which has the longest side, is an example of the color distribution degree derivation executor according to the present invention. Furthermore, the color distribution determiner 252 that performs Steps S423 to S429 of the color distribution determination process also forms an example of the determiner according to the present invention.

Third Embodiment

Next, a third embodiment of the present invention will be described.

Figure 18:
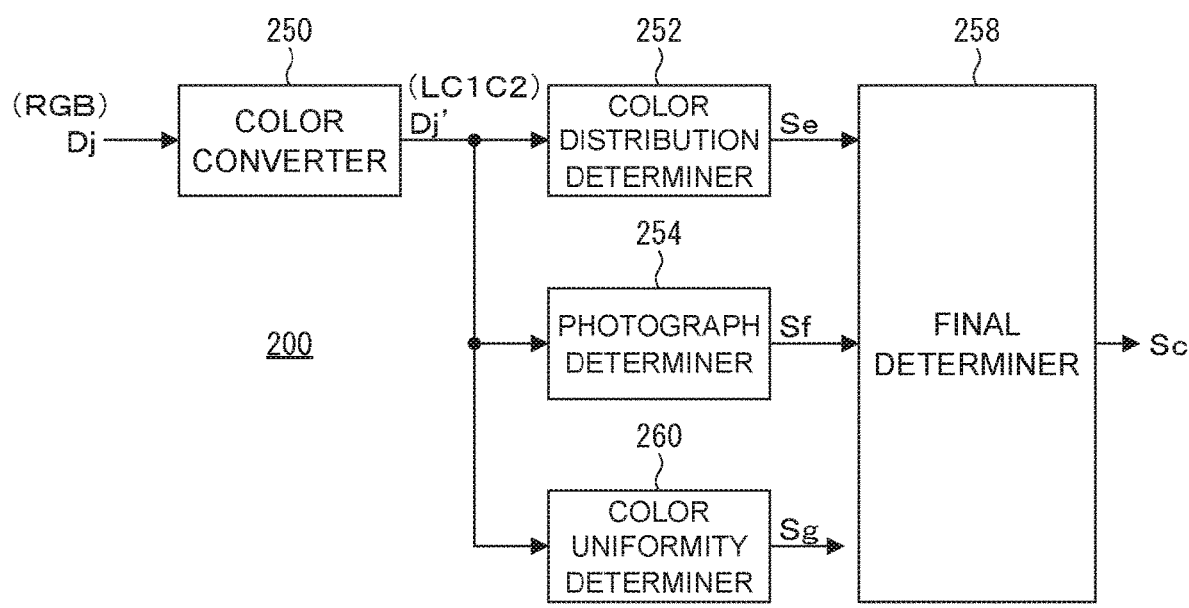
FIG. 18 is a block diagram illustrating a detailed configuration of the color number conversion determiner according to a third embodiment of the present invention.

According to the third embodiment, the color number conversion determiner 200 is configured as illustrated in FIG. 18. That is, according to the third embodiment, for example, a color uniformity determiner 260 is included instead of the white base determiner 256 according to the first embodiment. Other parts in the third embodiment are the same as those in the first embodiment. Therefore, the parts in the third embodiment identical to those in the first embodiment are denoted by the same reference numerals as those in the first embodiment, and detailed descriptions are omitted.

The color uniformity determiner 260 according to the third embodiment derives the color uniformity area ratio, which is the ratio of the color uniformity area pixel data forming the area where the pixel values may be regarded as being uniform, i.e., color uniformity area, to all sets of pixel data included in the input image data Di to the image processor 14. The color uniformity area described herein includes the white base area. The color uniformity area also includes a color base area, a solid color area, and the like. The color uniformity determiner 260 determines that the third condition is satisfied when the color uniformity area ratio is more than a predetermined threshold TH11. That is, the color uniformity determiner 260 handles the predetermined threshold TH11 as the third reference value. The color uniformity determiner 260 determines whether the third condition is satisfied based on whether the color uniformity area ratio is more than the predetermined threshold TH11. The predetermined threshold TH11 is determined as appropriate by experience such as experiment and is for example 60%.

Specifically, the color uniformity determiner 260 performs a smoothing process on each set of pixel data included in the image data Dj', strictly speaking, a color uniformity determination block that is a group of p×q (p and q are both integers equal to or more than 2) sets of pixel data including the corresponding pixel data as the pixel data of interest. Furthermore, p×q is for example 3×3 (i.e., p=3 and q=3) or 5×5 (i.e., p=5 and q=5).

For each color uniformity determination block, the color uniformity determiner 260 extracts the maximum value and the minimum value of the respective component values of L, C1, and C2 of the pixel data having undergone the smoothing process and calculates the mutual difference (=the maximum value−the minimum value) between the maximum value and the minimum value. Further, the color uniformity determiner 260 compares the respective mutual differences of L, C1, and C2 with a predetermined threshold TH10.

Here, for example, when the respective mutual differences of L, C1, and C2 are all equal to or less than the predetermined threshold TH10, the color uniformity determiner 260 determines that the pixel values of all sets of pixel data in the color uniformity determination block are uniform. The color uniformity determiner 260 handles the pixel data of interest in the color uniformity determination block as a color uniformity area pixel data candidate. Then, the color uniformity determiner 260 calculates the average value in the color uniformity determination block for each of the respective component values of L, C1, and C2. In addition, the color uniformity determiner 260 quantizes the average value for each of the respective component values of L, C1, and C2, specifically, shifts the bit number (eight bits) of the average value to the right by a predetermined number of bits, e.g., three bits, that is, discards the lower three bits. This quantization simplifies the subsequent processing. The color uniformity determiner 260 counts the pixel data of interest as a color uniformity area pixel data candidate having the quantized component values (quantization values) of L, C1, and C2. As illustrated in FIG. 19, the count value (frequency) is stored in a color uniformity count table 500 included in the color uniformity determiner 260.

According to the color uniformity count table 500 illustrated in FIG. 19, the number of color uniformity area pixel data candidates having the values of "31", "16", and "16" as the quantization values of L, C1, and C2 is "300000". The number of color uniformity area pixel data candidates having "31", "16", and "25" as the quantization values of L, C1, and C2 is "50000". The content of the color uniformity count table 500 illustrated in FIG. 19 is only an example.

Conversely, when at least any of the respective mutual differences of L, C1, and C2 is more than the predetermined threshold TH10, the color uniformity determiner 260 determines that the pixel values of all sets of pixel data in the color uniformity determination block are not uniform. For example, when there is color unevenness even though the color uniformity determination block forms a color base area or a solid color area, it is determined that the pixel values of all sets of pixel data in the color uniformity determination block are not uniform. In this case, the color uniformity determiner 260 does not count the pixel data of interest as a color uniformity area pixel data candidate.

In this manner, with regard to all sets of pixel data included in the image data Dj', the color uniformity determiner 260 determines whether it is a color uniformity area pixel data candidate and, when it is the color uniformity area pixel data candidate, stores its count value in the color uniformity count table 500. With regard to the color uniformity area pixel data candidate whose count value in the color uniformity count table 500 is equal to or more than a predetermined threshold TH12, the color uniformity determiner 260 regards it as color uniformity area pixel data instead of the candidate. The predetermined threshold TH12 described herein is set as appropriate in accordance with the size of the image data Dj' (strictly speaking, the input image data Di). For example, when it is assumed that, in the color uniformity count table 500 illustrated in FIG. 19, the above-described predetermined threshold TH12 is "10000", the color uniformity area pixel data candidates having the values of "31", "16", and "16" as the quantization values of L, C1, and C2, i.e., the number of color uniformity area pixel data candidates, "300000", are regarded as color uniformity area pixel data. Also, the color uniformity area pixel data candidates having "31", "16", and "25" as the quantization values of L, C1, and C2, i.e., the number of color uniformity area pixel data candidates, "50000", are regarded as color uniformity area pixel data.

The color uniformity determiner 260 derives, as the color uniformity area ratio, the ratio of the number (count value) of sets of color uniformity area pixel data to the number of all sets of pixel data included in the image data Dj'. For example, when it is assumed that, in the color uniformity count table 500 illustrated in FIG. 19, the predetermined threshold TH12 is "10000" as described above, the total number of sets of color uniformity area pixel data is "350000 (=300000+50000)".

The color uniformity determiner 260 compares the color uniformity area ratio with the predetermined threshold TH11. Here, for example, it is assumed that the color uniformity area ratio is more than the predetermined threshold TH11. In this case, the color uniformity determiner 260 recognizes that the ratio of the color uniformity area in the image data Dj' is relatively large. The color uniformity determiner 260 determines that a high compression rate may be obtained when the index color process is performed on the image data Dj' (strictly speaking, the input image data Di). Thus, the color uniformity determiner 260 determines that the third condition is satisfied.

Conversely, it is assumed that the color uniformity area ratio is equal to or less than the predetermined threshold TH11. In this case, the color uniformity determiner 260 recognizes that the ratio of the color uniformity area in the image data Dj' is relatively small, in other words, the area where the pixel values may be regarded as being uniform is relatively small. The color uniformity determiner 260 determines that it is difficult to obtain a high compression rate when the index color process is performed on the image data Dj' (strictly speaking, the input image data Di). Thus, the color uniformity determiner 260 determines that the third condition is not satisfied.

The color uniformity determiner 260 outputs the third determination signal Sg indicating the determination result obtained by itself. Then, the third determination signal Sg is input to the final determiner 258.

Figure 20:
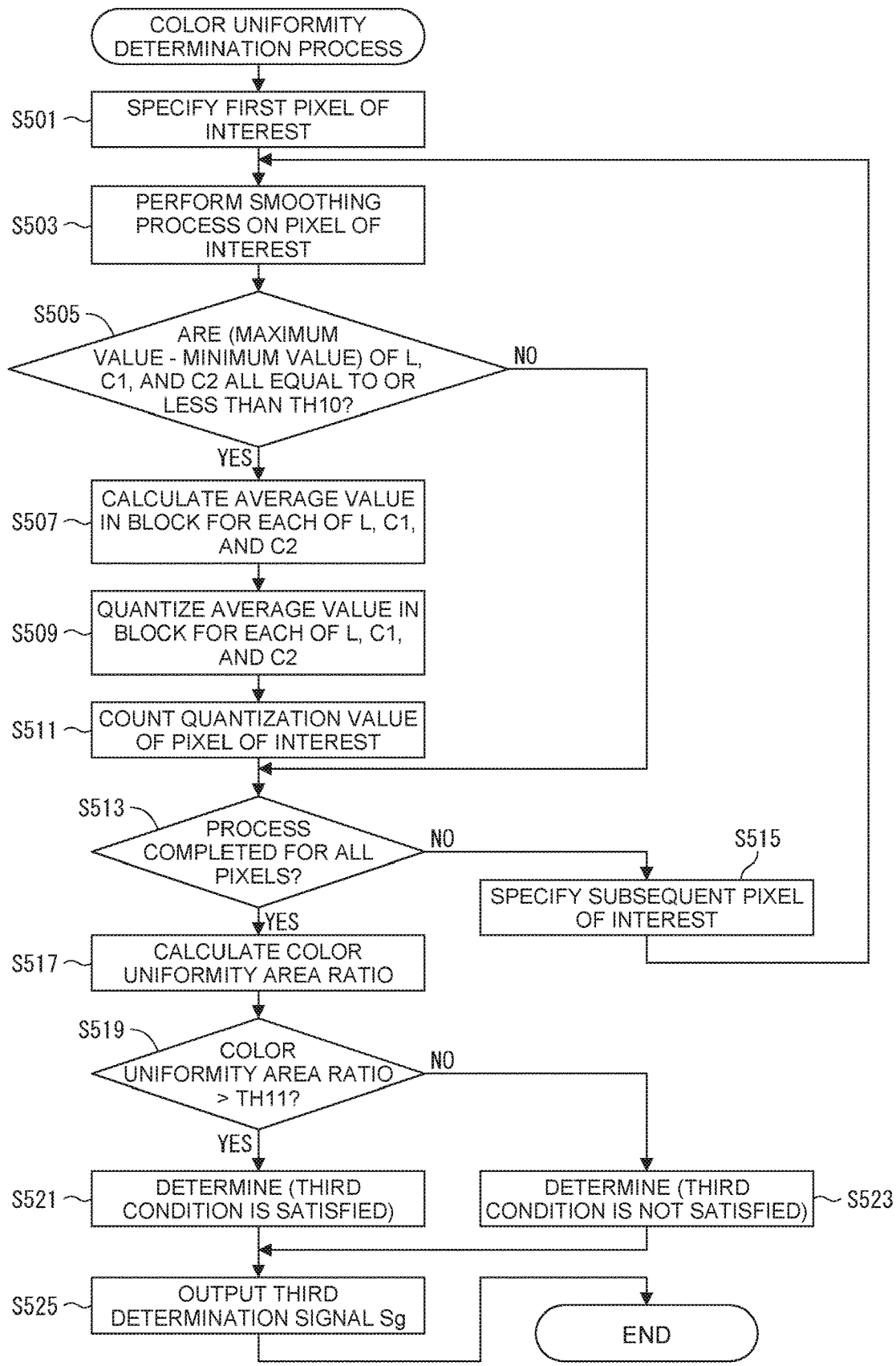
FIG. 20 is a flowchart illustrating a flow of a color uniformity determination process by a color uniformity determiner according to the third embodiment.

FIG. 20 illustrates the flow of the series of processes, i.e., the color uniformity determination process, by the color uniformity determiner 260.

During the color uniformity determination process, at Step S501, the color uniformity determiner 260 first focuses on first (leading) pixel data included in the image data Dj', i.e., specifies the first pixel of interest of the image based on the image data Dj'. Then, the color uniformity determiner 260 proceeds to the process at Step S503.

At Step S503, the color uniformity determiner 260 performs a smoothing process on the pixel of interest, strictly speaking, the above-described color uniformity determination block including the pixel of interest. Then, the color uniformity determiner 260 proceeds to the process at Step S505.

At Step S505, the color uniformity determiner 260 extracts the maximum value and the minimum value of the respective component values of L, C1, and C2 of the pixel data having undergone the smoothing process in the color uniformity determination block and calculates the mutual difference (=the maximum value−the minimum value) between the maximum value and the minimum value. The color uniformity determiner 260 compares the respective mutual differences of L, C1, and C2 with the predetermined threshold TH10. Here, for example, when the respective mutual differences of L, C1, and C2 are all equal to or less than the predetermined threshold TH10 (S505: YES), the color uniformity determiner 260 proceeds to the process at Step S507. Conversely, when at least any of the respective mutual differences of L, C1, and C2 is more than the predetermined threshold TH10 (S505: NO), the color uniformity determiner 260 proceeds to the process at Step S513 described below.

At Step S507, the color uniformity determiner 260 calculates the average value in the color uniformity determination block for each of the respective component values of L, C1, and C2 having undergone the smoothing process. The color uniformity determiner 260 proceeds to the process at Step S509.

At Step S509, the color uniformity determiner 260 quantizes the average value for each of the respective component values of L, C1, and C2, i.e., discards the lower three bits as described above. Then, the color uniformity determiner 260 proceeds to the process at Step S511.

At Step S511, the color uniformity determiner 260 counts the pixel data of interest as a color uniformity area pixel data candidate, i.e., stores its count value in a corresponding location of the color uniformity count table 500 (see FIG. 19). Then, the color uniformity determiner 260 proceeds to the process at Step S513.

At Step S513, the color uniformity determiner 260 determines whether the process of determining whether it is a color uniformity area pixel data candidate, i.e., the process from at least Step S503 to Step S505, has been completed for all sets of pixel data included in the image data Dj'. Here, for example, when the process of determining whether it is a color uniformity area pixel data candidate has been completed for all sets of pixel data (S513: YES), the color uniformity determiner 260 proceeds to the process at Step S517 described below. Conversely, when the process of determining whether it is a color uniformity area pixel data candidate has not been completed for all sets of pixel data (S513: NO), the color uniformity determiner 260 proceeds to the process at Step S515.

At Step S515, the color uniformity determiner 260 specifies the subsequent pixel of interest included in the image data Dj'. Then, the color uniformity determiner 260 returns to the process at Step S503.

Conversely, when the process proceeds from the above-described Step S513 to Step S517, the color uniformity determiner 260 calculates the color uniformity area ratio at Step S517. Specifically, with regard to the color uniformity area pixel data candidate whose count value in the color uniformity count table 500 is equal to or more than the above-described predetermined threshold TH12, the color uniformity determiner 260 regards it as color uniformity area pixel data instead of the candidate. The color uniformity determiner 260 derives, as the color uniformity area ratio, the ratio of the number (count value) of sets of color uniformity area pixel data to the number of all sets of pixel data included in the image data Dj'. Then, the color uniformity determiner 260 proceeds to the process at Step S519.

At Step S519, the color uniformity determiner 260 compares the color uniformity area ratio derived at Step S517 with the predetermined threshold TH11. Here, for example, when the color uniformity area ratio is more than the predetermined threshold TH11 (S519: YES), the color uniformity determiner 260 proceeds to the process at Step S521. Conversely, when the color uniformity area ratio is equal to or less than the predetermined threshold TH11 (S519: NO), the color uniformity determiner 260 proceeds to the process at Step S523.

At Step S521, the color uniformity determiner 260 determines that the third condition is satisfied. Then, the color uniformity determiner 260 proceeds to the process at Step S525.

Conversely, when the process proceeds from the above-described Step S519 to Step S523, the color uniformity determiner 260 determines, at Step S523, that the third condition is not satisfied. Then, the color uniformity determiner 260 proceeds to the process at Step S525.

At Step S525, the color uniformity determiner 260 outputs the third determination signal Sg indicating the determination result at Step S521 or S523. Then, the color uniformity determiner 260 ends the series of color uniformity determination processes.

As described above, according to the third embodiment, in particular, with the color uniformity determiner 260, the ratio of the color uniformity area including the color base area and the solid color area as well as the white base area in the image based on the input image data Di is used as a criterion for determining whether the third condition is satisfied and is thus used as one of the criteria for determining whether it is appropriate to perform either the index color process or the full-color process. According to the third embodiment, as in the first embodiment, it is possible to properly determine whether it is appropriate to perform either the index color process or the full-color process.

According to the third embodiment, the color uniformity determiner 260 is included in place of the white base determiner 256 in the first embodiment, but the color uniformity determiner 260 may be included in place of the white base determiner 256 in the second embodiment. In this case, the color uniformity determination process is performed on the RGB format image data Di instead of the LC1C2 format image data Dj'.

The color uniformity determiner 260 according to the third embodiment, in particular, the color uniformity determiner 260 that performs Steps S501 to S517 of the color uniformity determination process (see FIG. 20), is also an example of the color uniformity area ratio deriver according to the present invention. In particular, the color uniformity determiner 260 that performs Steps S501 to S515 of the color uniformity determination process is an example of the specifier according to the present invention. The color uniformity determiner 260 that performs Step S517 of the color uniformity determination process is an example of the color uniformity area ratio derivation executor according to the present invention. The color uniformity determiner 260 that performs Steps S519 to S525 of the color uniformity determination process also forms an example of the determiner according to the present invention.

Other Application Examples

Each of the above embodiments is a specific example of the present invention and does not limit the technical scope of the present invention. The present invention is also applicable to aspects other than the above embodiments.

For example, the color distribution determination process by the color distribution determiner 252, the photograph determination process by the photograph determiner 254, the white base determination process by the white base determiner 256, and the color uniformity determination process by the color uniformity determiner 260 may be performed in manners other than the manner described in each of the embodiments.

Although the compression process using for example the Deflate method is adopted as the compression process using the lossless compression method, a compression process using a method other than the Deflate method may be adopted. Although the compression process using for example the JPEG method is adopted as the compression process using the lossy method, a compression process using a method other than the JPEG method may be adopted.

Also, the image data Da having undergone the compression process by the compression processor 220 of the image processor 14 is formed into a PDF file regardless of the compression method, but the present invention is not limited thereto. For example, it may be formed into a TIFF file instead of a PDF file. Alternatively, the image data Da having undergone the compression process using the Deflate method may be formed into a PNG file. Furthermore, the image data Da having undergone the compression process using the JPEG method may be formed into a JPEG file.

Although the LAB format image data is described as an example of the LC1C2 format image data, the present invention is not limited thereto. The present invention is also applicable when the image data of, for example, XYZ format, CIELUV format, or CIELCH format, other than LAB format is adopted.

For example, according to the first embodiment, as illustrated in FIG. 4, the color distribution determiner 252, the photograph determiner 254, and the white base determiner 256 are configured to be in parallel in the color number conversion determiner 200, they may be configured to be in series. Specifically, a configuration may be such that the color distribution determination process by the color distribution determiner 252, the photograph determination process by the photograph determiner 254, and the white base determination process by the white base determiner 256 are sequentially executed. This also applies to the second embodiment (see FIG. 14) and the third embodiment (see FIG. 18), too.

Furthermore, in an example described in each of the embodiments, the present invention is applied to the multifunction peripheral 10, but the present invention is not limited thereto. Obviously, the present invention is applicable to for example an image reading apparatus dedicated to an image scanner. In extreme cases, the present invention is applicable to an image processing apparatus having only an automatic discrimination function.

Furthermore, the present invention may be provided not only in the form of an apparatus such as an image processing apparatus, but also in the form of a program such as an image processing program, and in the form of a method such as an image processing method.

The present invention may also be provided in the form of a computer-readable recording medium having an image processing program recorded therein. In this case, the image processing program recorded on the recording medium is read and executed by a computer, and thus an image-forming apparatus similar to the present invention is implemented. The recording medium described herein includes a semiconductor medium such as a USB memory and an SD memory card or a disk medium such as a CD and a DVD. Instead of a portable medium, an embedded (built-in) medium embedded in an image-forming apparatus (computer system), such as a ROM or a hard disk drive, is also applicable as the recording medium described herein.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
a color distribution degree deriver that derives a color distribution degree that is a distribution degree of pixel values of respective sets of pixel data included in input image data;
a photograph area ratio deriver that derives a photograph area ratio that is a ratio of photograph area pixel data forming a photograph area associated with the pixel data;
a color uniformity area ratio deriver that derives a color uniformity area ratio that is a ratio of color uniformity area pixel data forming a color uniformity area where the pixel values are defined as being uniform to the pixel data; and
a determiner that determines whether to perform either an index color process by performing a compression process using a lossless compression method after performing a color reduction process on the input image data or a full-color process by performing a compression process using a lossy compression method without performing the color reduction process on the input image data based on the color distribution degree, the photograph area ratio, and the color uniformity area ratio, wherein
the determiner further determines to perform the index color process only when the color distribution degree is less than a first reference value, the photograph area ratio is less than a second reference value, and the color uniformity area ratio is more than a third reference value.

2. The image processing apparatus according to claim 1, wherein the color distribution degree deriver includes
a determination color reducer that performs a determination color reduction process using a median cut algorithm on the input image data to cut a color space, which is a coordinate space of the input image data, into subspaces corresponding to a predetermined number of colors, and
a color distribution degree derivation executor that derives the color distribution degree based on a size of a subspace, after division, among the subspaces corresponding to the predetermined number of colors by the determination color reducer.

3. The image processing apparatus according to claim 2, wherein the determination color reducer divides the color space into an achromatic space, which is defined as a space having an achromatic color, and a chromatic space, which is defined as a space having a chromatic color, and then cuts the color space including the achromatic space and the chromatic space into the subspaces corresponding to the predetermined number of colors.

4. The image processing apparatus according to claim 3, wherein the determination color reducer further divides the color space into the one achromatic space and two or more predetermined chromatic spaces and then cuts the color space including the achromatic space and the chromatic spaces into the subspaces corresponding to the predetermined number of colors.

5. The image processing apparatus according to claim 1, wherein the photograph area ratio deriver includes
an entropy deriver that derives, for each block that is a group of the pixel data in a predetermined number of units, an entropy that is a feature value of a histogram of pixel values of the pixel data included in the block,
a photograph area block determiner that determines whether, for each block, the block is a photograph area block forming the photograph area based on the entropy, and
a photograph area ratio derivation executor that derives, as the photograph area ratio, a ratio of a number of the photograph area blocks to a number of all blocks.

6. The image processing apparatus according to claim 5, wherein the entropy deriver derives the entropy after excluding character area pixel data forming a character area from the pixel data included in the block.

7. The image processing apparatus according to claim 1, wherein the color uniformity area ratio deriver includes
a specifier that specifies, as the color uniformity pixel data, more than a predetermined number of sets of the pixel data where the pixel values are defined as being uniform, and
a color uniformity area ratio derivation executor that derives, as the color uniformity area ratio, a ratio of a number of sets of the color uniformity pixel data to a number of all sets of the pixel data.

8. The image processing apparatus according to claim 1, wherein the color uniformity area ratio deriver includes
a specifier that specifies, as the color uniformity pixel data, pixel data where a pixel value is defined as a value representing white, and
a color uniformity area ratio derivation executor that derives, as the color uniformity area ratio, a ratio of a number of sets of the color uniformity pixel data to a number of all sets of the pixel data.

9. The image processing apparatus according to claim 1, wherein the input image data includes read image data by an image reading apparatus that reads an image of a document.

10. A non-transitory computer-readable recording medium having an image processing program recorded thereon, the image processing program including one or more instructions that, when executed by one or more processors, causing the one or more processors to:
derive a color distribution degree that is a distribution degree of pixel values of respective sets of pixel data included in input image data;
derive a photograph area ratio that is a ratio of photograph area pixel data forming a photograph area to the pixel data;
derive a color uniformity area ratio that is a ratio of color uniformity area pixel data forming a color uniformity area where the pixel values are defined as being uniform to the pixel data; and
determine whether to perform either an index color process to perform a compression process using a lossless compression method after performing a color reduction process on the input image data or a full-color process to perform a compression process using a lossy compression method without performing the color reduction process on the input image data based on the color distribution degree, the photograph area ratio, and the color uniformity area ratio, wherein
the one or more processors further determine to perform the index color process only when the color distribution degree is less than a first reference value, the photograph area ratio is less than a second reference value, and the color uniformity area ratio is more than a third reference value.

11. An image processing method comprising:
deriving a color distribution degree that is a distribution degree of pixel values of respective sets of pixel data included in input image data;
deriving a photograph area ratio that is a ratio of photograph area pixel data forming a photograph area to the pixel data;
deriving a color uniformity area ratio that is a ratio of color uniformity area pixel data forming a color uniformity area where the pixel values are defined as being uniform to the pixel data; and
determining whether to perform either an index color process to perform a compression process using a lossless compression method after performing a color reduction process on the input image data or a full-color process to perform a compression process using a lossy compression method without performing the color reduction process on the input image data based on the color distribution degree, the photograph area ratio, and the color uniformity area ratio, wherein
the method further comprises determining to perform the index color process only when the color distribution degree is less than a first reference value, the photograph area ratio is less than a second reference value, and the color uniformity area ratio is more than a third reference value.

* * * * *